United States Patent [19]
Yanaka et al.

[11] Patent Number: 5,884,015
[45] Date of Patent: Mar. 16, 1999

[54] IMAGE FORMING APPARATUS FOR PLURAL SCANNING

[75] Inventors: Toshiyuki Yanaka, Tokyo; Kazuyoshi Takahashi, Kashiwazaki; Hiroshi Endo, Sagamihara; Toshiaki Mabuchi, Tama, all of Japan

[73] Assignee: Canon Kabushiki Kaisha, Tokyo, Japan

[21] Appl. No.: 947,331

[22] Filed: Oct. 8, 1997

Related U.S. Application Data

[63] Continuation of Ser. No. 678,170, Jul. 11, 1996, abandoned, which is a continuation of Ser. No. 312,925, Sep. 30, 1994, abandoned.

[30] Foreign Application Priority Data

Oct. 1, 1993 [JP] Japan ................................. 5-247232

[51] Int. Cl.$^6$ ................................................. G06F 15/00
[52] U.S. Cl. ........................................... 395/115; 395/113
[58] Field of Search ................................. 395/115, 101, 395/114, 106, 110, 109, 117, 113, 112, 111, 108, 107, 1.7, 1.5, 1.4, 116

[56] References Cited

U.S. PATENT DOCUMENTS

| | | | |
|---|---|---|---|
| 4,622,561 | 11/1986 | Koike | 346/1.1 |
| 4,999,646 | 3/1991 | Trask | 346/11 |
| 5,163,125 | 11/1992 | Okada | 395/115 |
| 5,233,365 | 8/1993 | Uemura et al. | 395/108 |
| 5,261,039 | 11/1993 | Miyazaki | 395/144 |
| 5,307,458 | 4/1994 | Freiburg et al. | 395/162 |
| 5,322,378 | 6/1994 | Ikeda et al. | 400/68 |
| 5,327,526 | 7/1994 | Nomura et al. | 395/115 |
| 5,341,471 | 8/1994 | Yamazaki et al. | 395/164 |
| 5,349,647 | 9/1994 | Freiburg et al. | 395/115 |
| 5,355,441 | 10/1994 | Kawai et al. | 395/115 |
| 5,377,311 | 12/1994 | Carlock et al. | 395/114 |
| 5,430,469 | 7/1995 | Shioya et al. | 347/15 |

*Primary Examiner*—Matthew M. Kim
*Assistant Examiner*—Steven P. Sax
*Attorney, Agent, or Firm*—Fitzpatrick, Cella, Harper & Scinto

[57] ABSTRACT

An image forming apparatus has an upper print head unit and a lower print head unit that print plural printing areas in order on a printing medium. The image forming apparatus defers printing, as long as the image data corresponding to the areas to be printed are not transferred from a host apparatus, and begins printing when the image data are transferred from the host apparatus. The image forming apparatus can thus print an unfixed length of continuous image without monopolizing the host apparatus.

19 Claims, 21 Drawing Sheets

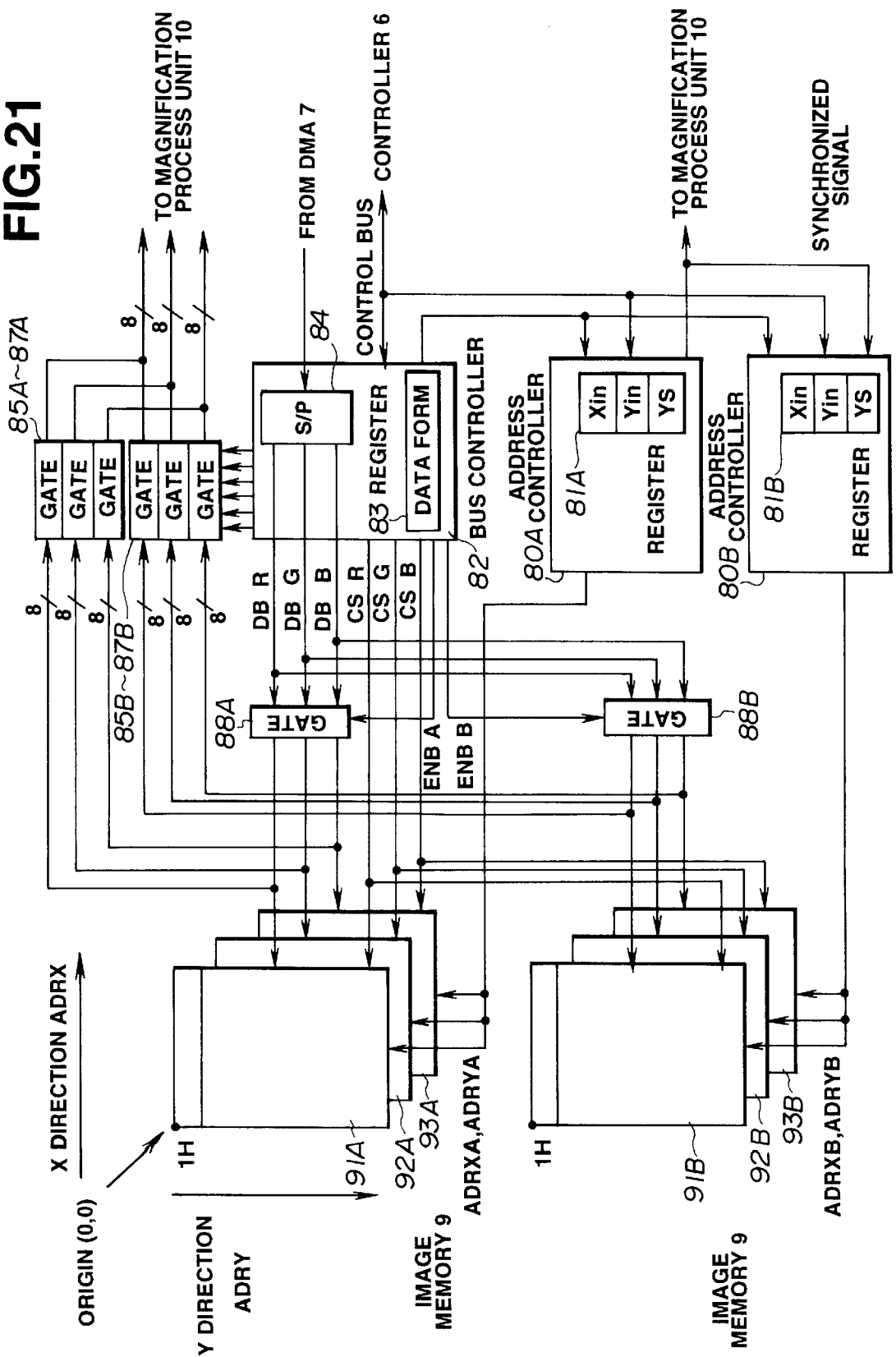

IMAGE FORMING APPARATUS FOR PLURAL SCANNING

This application is a continuation of application Ser. No. 08/678,170 filed Jul. 11, 1996, abandoned, which is a continuation of application Ser. No. 08/312,925 filed Sep. 30, 1994, abandoned.

BACKGROUND OF THE INVENTION

1. Field of the Invention

This invention relates to an image forming apparatus which receives image data and forms an image corresponding to the image data on a printing medium.

2. Related Background Art

Conventionally, typical image forming apparatuses such as printers are line printers which print one page while receiving input data line by line, and page printers which print after receiving image data corresponding to one or more entire pages and storing the received data in a memory provided for that purpose. It is conventional that image data is processed page by page (where the page is of a certain fixed size), and the image is formed, on the basis of the image data, on a printing medium such as cut paper or roll paper.

Therefore, when a long, continuous image that is not of some standard length (e.g., one page of a standard size) is printed on the printing medium using a conventional page printer, it is necessary to provide a large memory for storing data corresponding to the image. Further, when such data is stored in a multi-page memory, as in a page printer, the image is not printed continuously.

On the other hand, in a line printer, such an image can be printed while the data is being received, that is, data reception continues during printing. However, for this to be done, the host computer must be occupied in order to communicate with the printer, until the printing ends. If the host computer is occupied for this purpose, especially when the host computer is used to control plural printers, the waiting time for the other printers is inconveniently long, and therefore, the operation of the overall system is not efficient.

In addition to the foregoing problems, it takes a long time to transfer a large quantity of image data from the host computer to an image forming apparatus such as a printer, and thus in such a case it takes longer than desirable to print the image data.

SUMMARY OF THE INVENTION

This invention is designed to overcome the above problems in conventional structure. It is accordingly an object of the invention to provide an image forming apparatus which can print a long, continuous image of unfixed length on a printing medium without preempting the time of the host apparatus longer than necessary.

The image forming apparatus according to this invention can receive image during printing, the time period while printing is stopped, can be shortened, and a large amount of continuous image data can be received by the image forming apparatus in a short time.

BRIEF DESCRIPTION OF THE DRAWINGS

FIG. 21 is a block diagram showing the primary internal constitution of the image memory 9 and the image memory control unit 8 in the printer 2 according to the embodiment whose operation is shown in FIG. 20.

DETAILED DESCRIPTION OF THE PREFERRED EMBODIMENTS

Embodiments of image forming apparatus according to the present invention will be described in detail with reference to the accompanying drawings.

Figure 1:
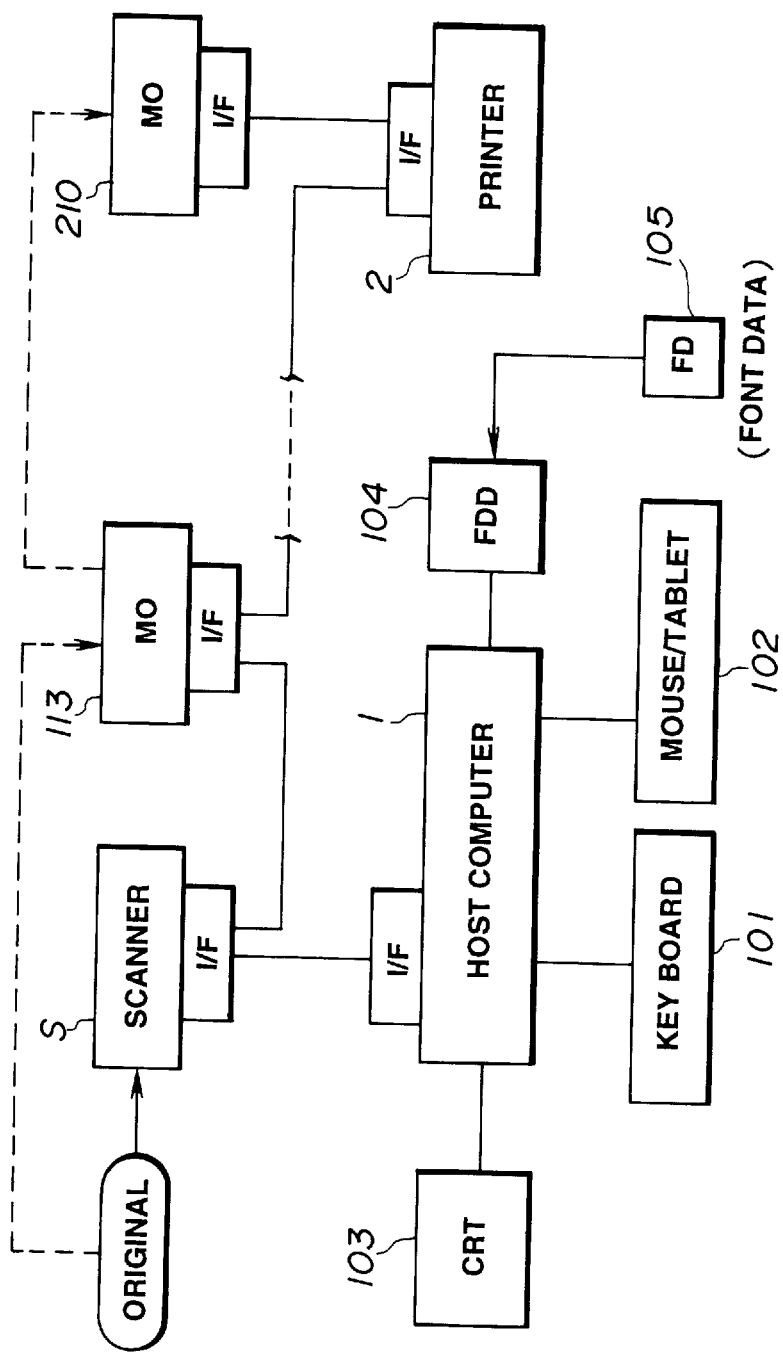
FIG. 1 is a block diagram showing the basic construction of the image forming system of one embodiment of the present invention.

FIG. 1 is a block diagram showing the system construction according to one embodiment of the present invention.

In FIG. 1, a host computer 1 and a printer 2 are used for processing an operation such as magnification.

Figure 2:
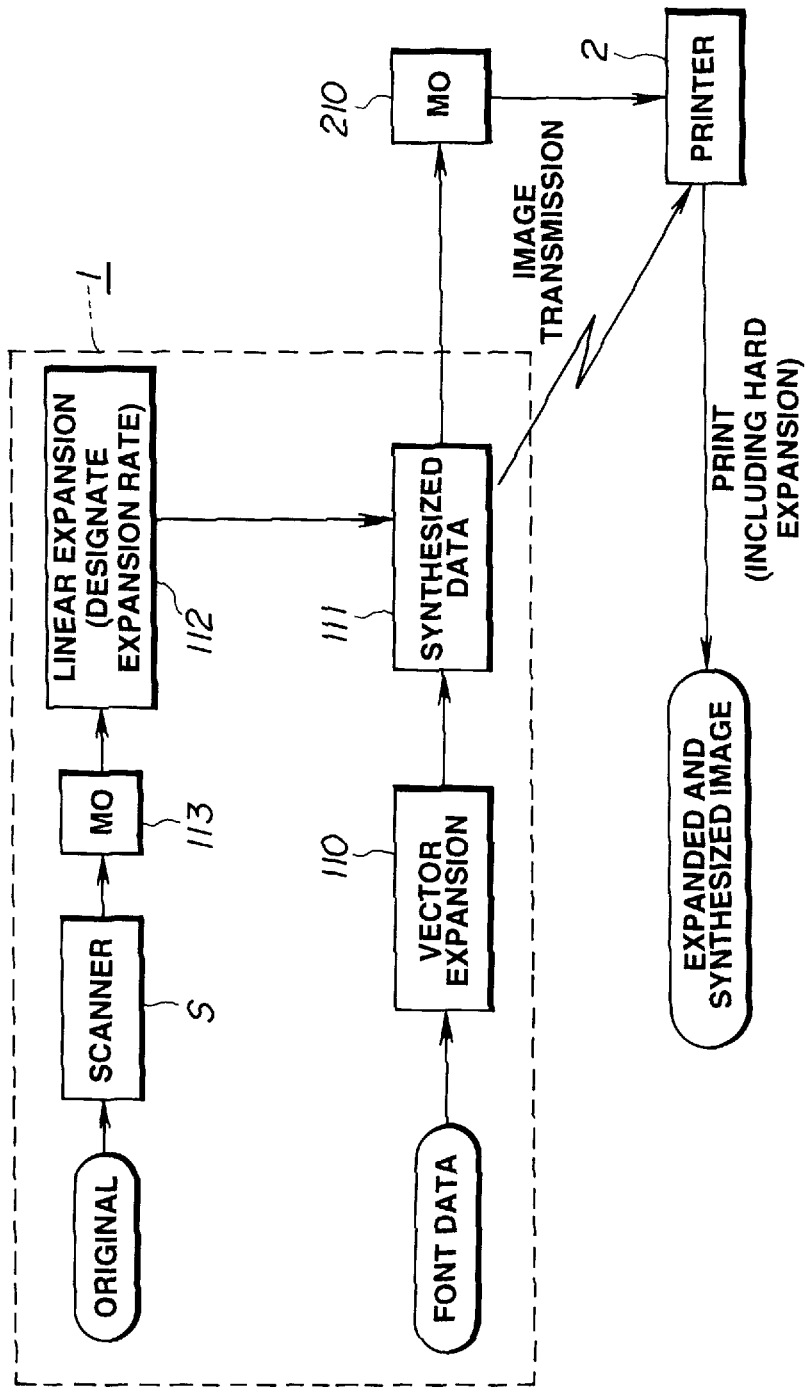
FIG. 2 is a diagram showing the flow of image forming process performed by the image forming system.
Figure 3:
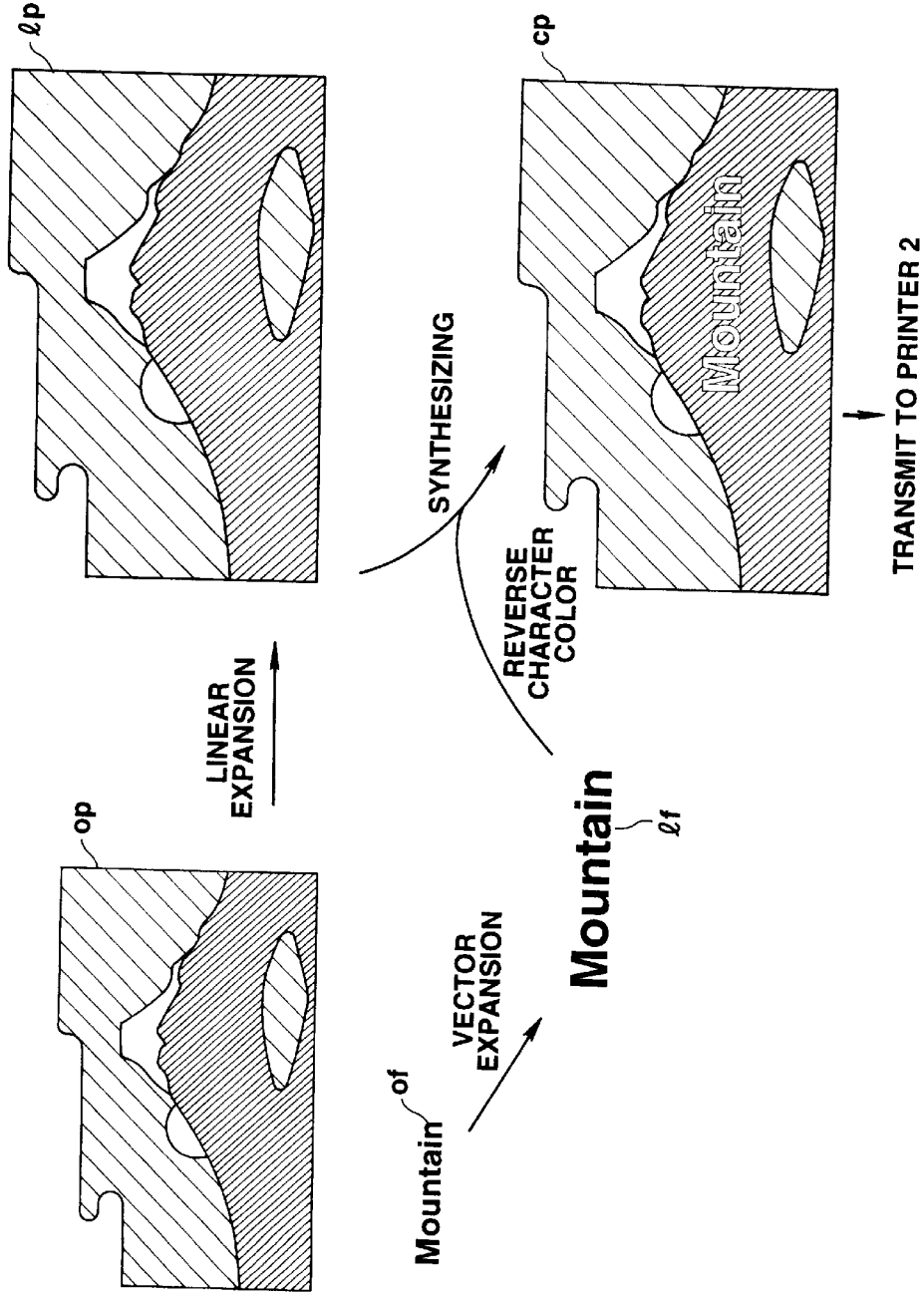
FIG. 3 is a view for explaining the flow of image forming process visually.

FIG. 2 shows a schematic flow of the image processing of the host computer 1, and FIG. 3 shows the flow of the image processing visually.

As shown in FIG. 1, various peripheral apparatuses are connected to the host computer 1. A keyboard 101, for use as a data input means and a mouse/tablet 102, to serve as a data processing operation means, are connected to the host computer 1, by which the formation of a synthesized image through visual information of a CRT 103 and a designation of magnification rate can be performed.

An original image is read by a scanner S, which produces corresponding digital image data and transfers the data to the host computer 1, where it is stored in a disc (not shown) in a magnetic-optical disc drive (MO) 113.

Information, such as font data, to be used in image synthesis is stored in a floppy disc (FD) 105 and is read by a floppy disc drive (FDD) 104.

Digital data representing an original image (op) shown in FIG. 3, read by the scanner S, is stored in the disc in magneto-optical disc drive 113, and the digital data is magnified linearly by a linear magnification process 112 and the processed, magnified data (lp) shown in FIG. 3 is obtained.

In addition, font data (of) which is to be synthesized with the scanned image data, is processed to produce magnified font data (lf) shown in FIG. 3, by vector magnification process 110 (this magnification process is performed by means of software in the preferred embodiments).

The two bodies of data (lp) and (lf) obtained by the above described magnification process are synthesized by data synthesizing process 111, and synthesized data (cp), shown in FIG. 3, is obtained.

This synthesized data (cp) is stored in the disc in another magneto-optical disc drive 210, or is directly transferred to the printer 2.

In the above-described system construction, information such as magnification size, and the arrangement the respective bodies of data are to have in the synthesized image, is included in an image format, and the printing is performed with the desired image magnification and image synthesis based on this format information.

Figure 4:
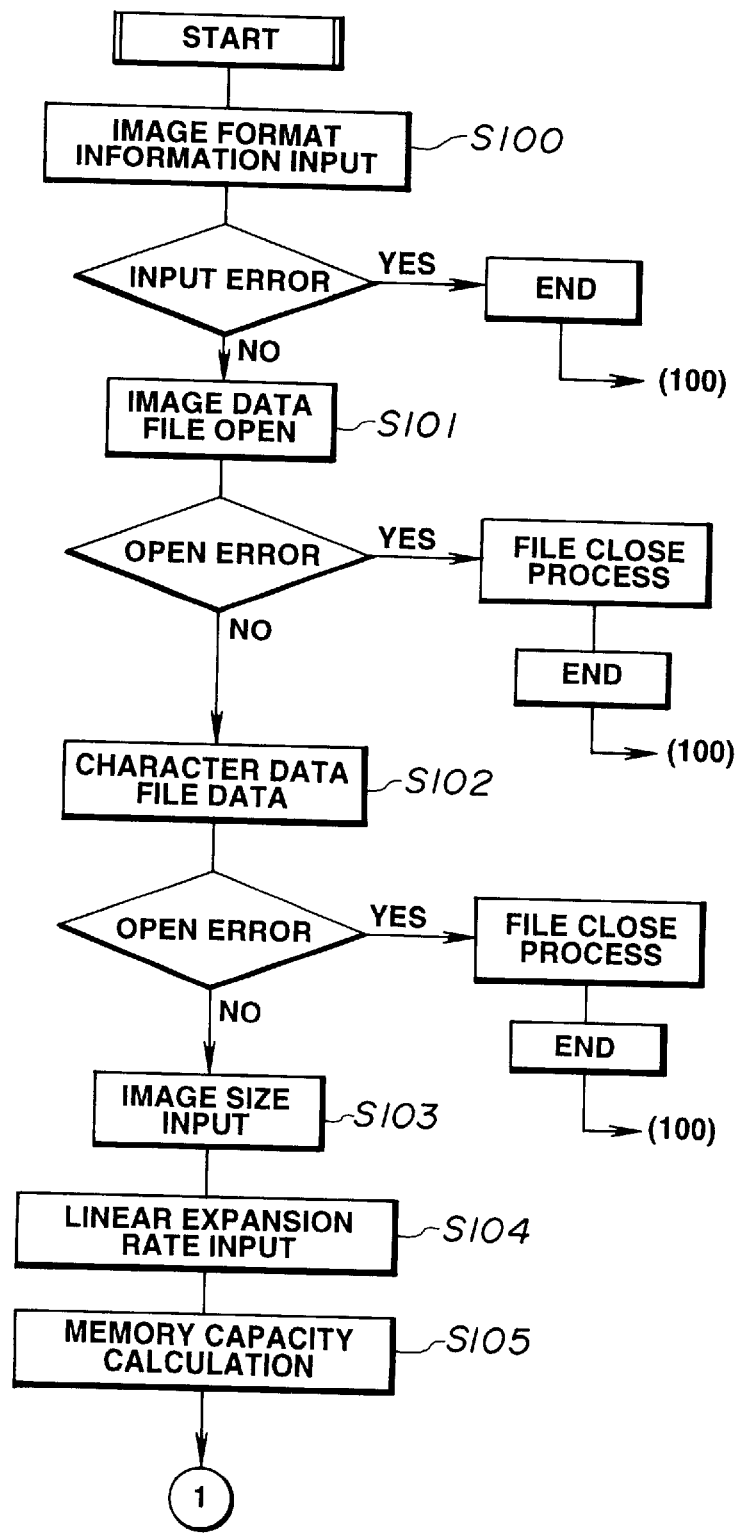
FIG. 4 is a flowchart showing the process of magnification and synthesis performed by the host computer in the image forming system.

The image magnification performed by the above-described linear magnification process will now be described with reference to the flow charts shown in FIGS. 4 to 6.

Figure 19:
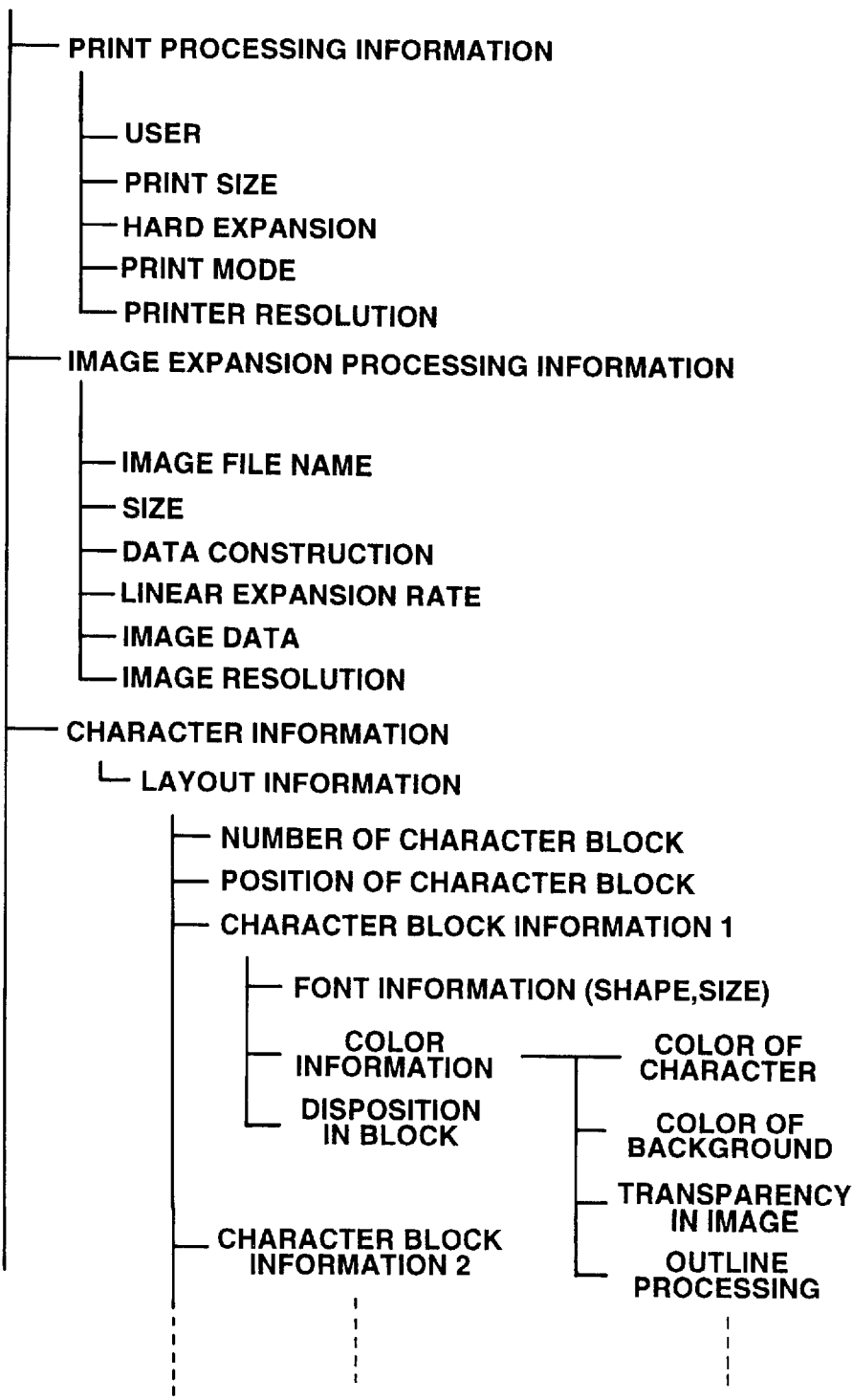
FIG. 19 is an illustration of the image format used by the image forming system.

First, image format information of the image to be printed, referred to in FIG. 19, is input, and the process information is obtained (step S100). A check is made to see if there has been an error in the inputting of the information, and if so, the processing ends. Otherwise, an image data file and a character data file are opened based on the input information (steps S101 and S102). (After each of these steps a check is made to see if there has been an error in the file-opening process, and if so, the file is closed, and the process ends.) Then the size of the image data and the linear magnification rate are input (steps S103 and S104). Next, the memory capacity that will be required to accommodate the image after magnification is calculated based on the input data size and magnification rate (step S105), to confirm that the memory capacity to be used does not exceed the capacity of the memory installed in the printer 2 (step S106). If the required capacity is found to exceed the printer memory capacity, the files are closed, and the process ends.

Next, character information for all the character data to be included in the synthesized image is input in order (step S107), and the area that the characters will occupy after synthesis is calculated based on the font type, the size of the image format and synthesis base position (step S108), to be certain that that area is within the above-confirmed image data area (step S109). Otherwise, the file is closed, and the process ends. (These steps are omitted if all the data is character data.)

After it is confirmed in the foregoing manner that there is no problem in the image magnification and synthesizing process, magnification of the image data is performed (step S110).

Figure 7:
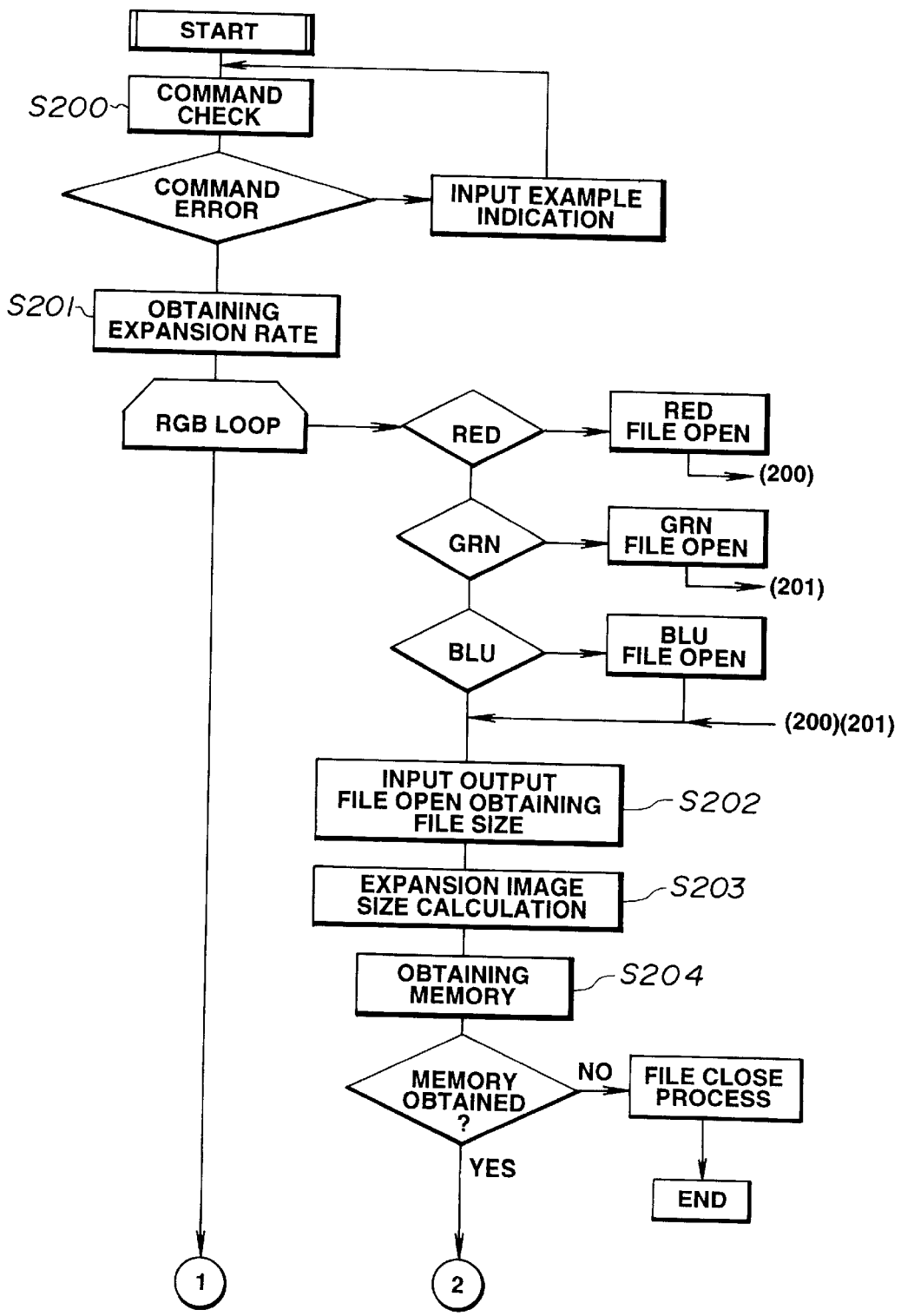
FIGS. 7 to 9 are flowcharts showing details of the linear magnification process.
Figure 8:
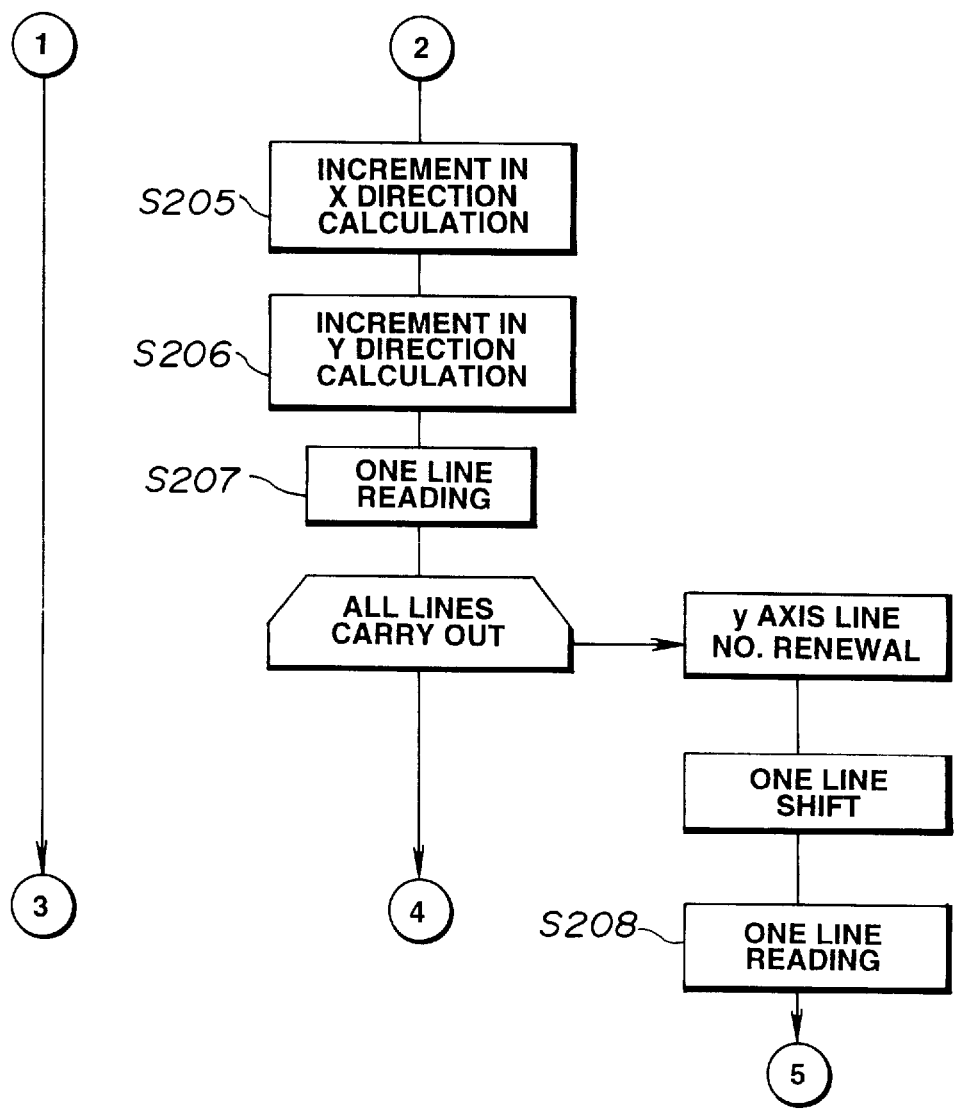
Figure 9:
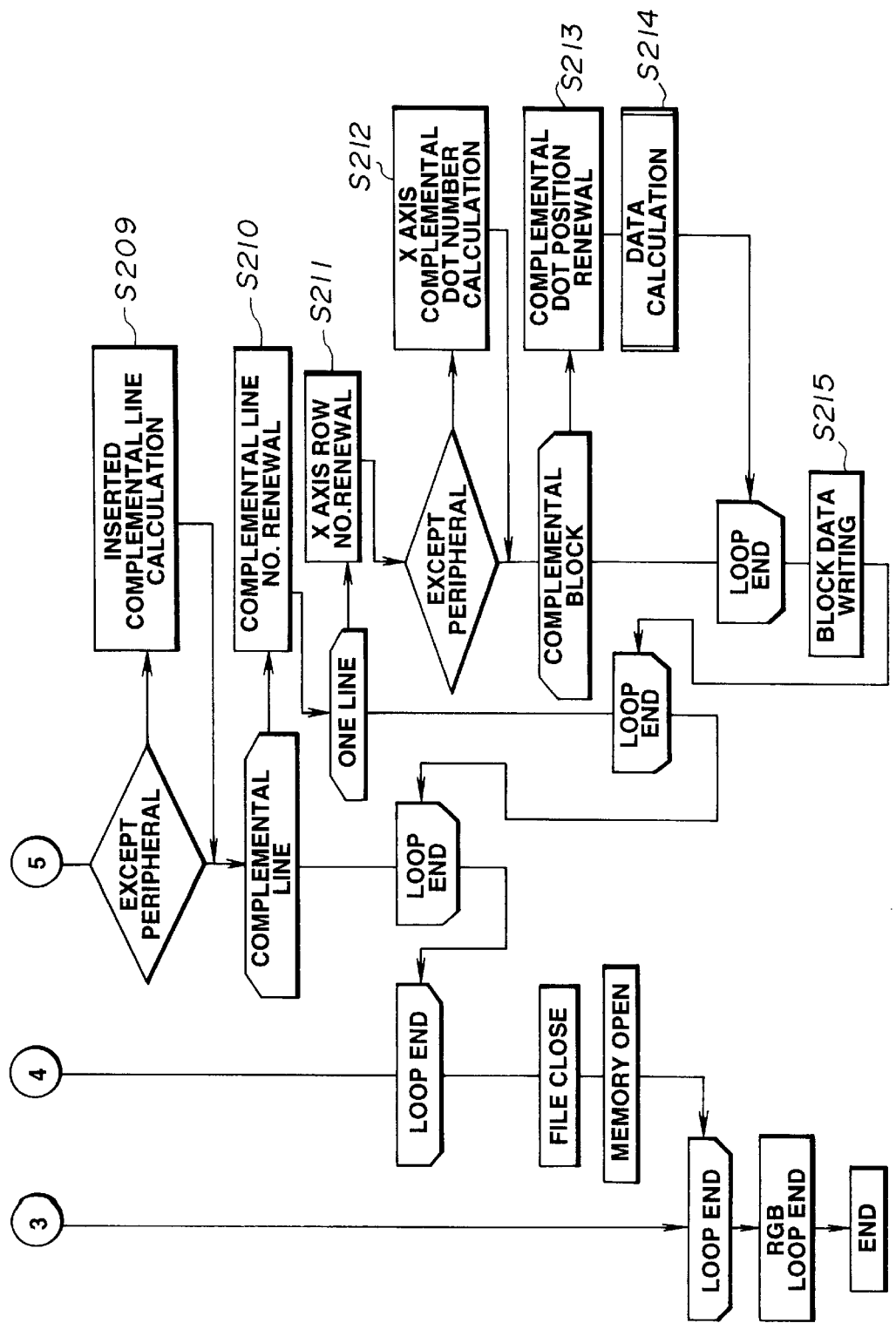

The linear magnification process used in this embodiment will now be described, as an example of a software magnification process suitable for that purpose, with reference to the flow charts shown in FIGS. 7 to 9.

After the magnification command is confirmed (step S200), the magnification rate is input (step S201), and the process is started. First, image data files are opened for red, green and blue image information, the image size is obtained (step S202), and the magnified image size is calculated based on the image size and the magnification rate (step S203). Then, a check is made to ensure that sufficient memory for processing (operation memory) is allocated (step S204), if not, the files are closed, and the process ends.

In this linear magnification process, complemental pixels are inserted, one or more at a time, in between pixels of the existing image data, in order to improve smoothness and continuity of gradation between adjacent pixels in the ingredient image. In this method, it is proposed that the proper allocation of these inventions be determined based on analysis of two-dimensional groups of four pixels, consisting of two upper adjacent pixels and two lower adjacent pixels, respectively arranged at the four corners of such a group.

The size of the arrangement or group after magnification (and thus the actual magnification rate achieved) depends on the number of the complemental pixels which are inserted lengthwise (vertically) and sideways (horizontal). However, since the total number of complemental pixels to be inserted is calculated based on the desired magnification rate, and this is done such that the complemental pixels are distributed between the original pixels in as uniform a manner as possible, the actual magnification is not absolutely uniform at pixel level, but depends on the position of the line of input data in question. Therefore, the actual increments in length are calculated respectively for the X-direction (lengthwise) and in the Y-direction (sideways) (steps S205 and S206).

In the complementing process, first, pixel data for a horizontal line is input (step S207), after which data of the following line is input (step S208). In this way, the data of two lines are input, the data of four pixels from those lines are picked up and the numbers of the inserted lines and inserted rows in the lengthwise direction and in the sideways direction at that position are respectively calculated (steps S209 and S212). Then, the two-dimensional arrangement size is determined, and each line of the magnified image including the complemental line is renewed (step S210).

Further, the pixel position in which four pixels are picked up for each pixel of the original image is renewed in the renewed line (step S211), then the pixel position including the complemental pixel is renewed (step S213), and the complemental data is calculated (step S214). In this calculation, while the data at the four corners is used as it is, data for another, complemental pixel is calculated based on the data of the pixels at the four corners. With this process, the calculation is performed such that the differences between data of adjacent pixels, arranged in this two-dimensional arrangement, are fairly uniform. The calculation is performed by proportional weighting. Assuming that the data of the pixels at the four corners is, respectively, $a(k,l)$, $a(k+1,l)$, $a(k+1,l)$, and $a(k+1, l+1)$, and that the size of the two-dimensional arrangement is $(x+1)*(y+1)$, the complemental data in the arrangement is obtained from the following equation:

$$h(m.n) = n[m*a(k+1,l+1)+(k-m)*a(k,l+1)]+(y-n) \ s[(m*a(k+1,l)=(x-m)*a(k,l)]/x*y$$

$$o \leq m \leq x, \ o \leq n \leq y$$

Next, image data obtained by the above calculation is stored (step S215), and similar processing, beginning with the inputting of the original image data, is repeatedly performed until all lines of the image have been input.

The above-mentioned processing is performed with reference to red, to green, and to blue, respectively, and the magnification process (linear magnification process) of step S110 (FIG. 5) is performed for all of this data.

Figure 5:
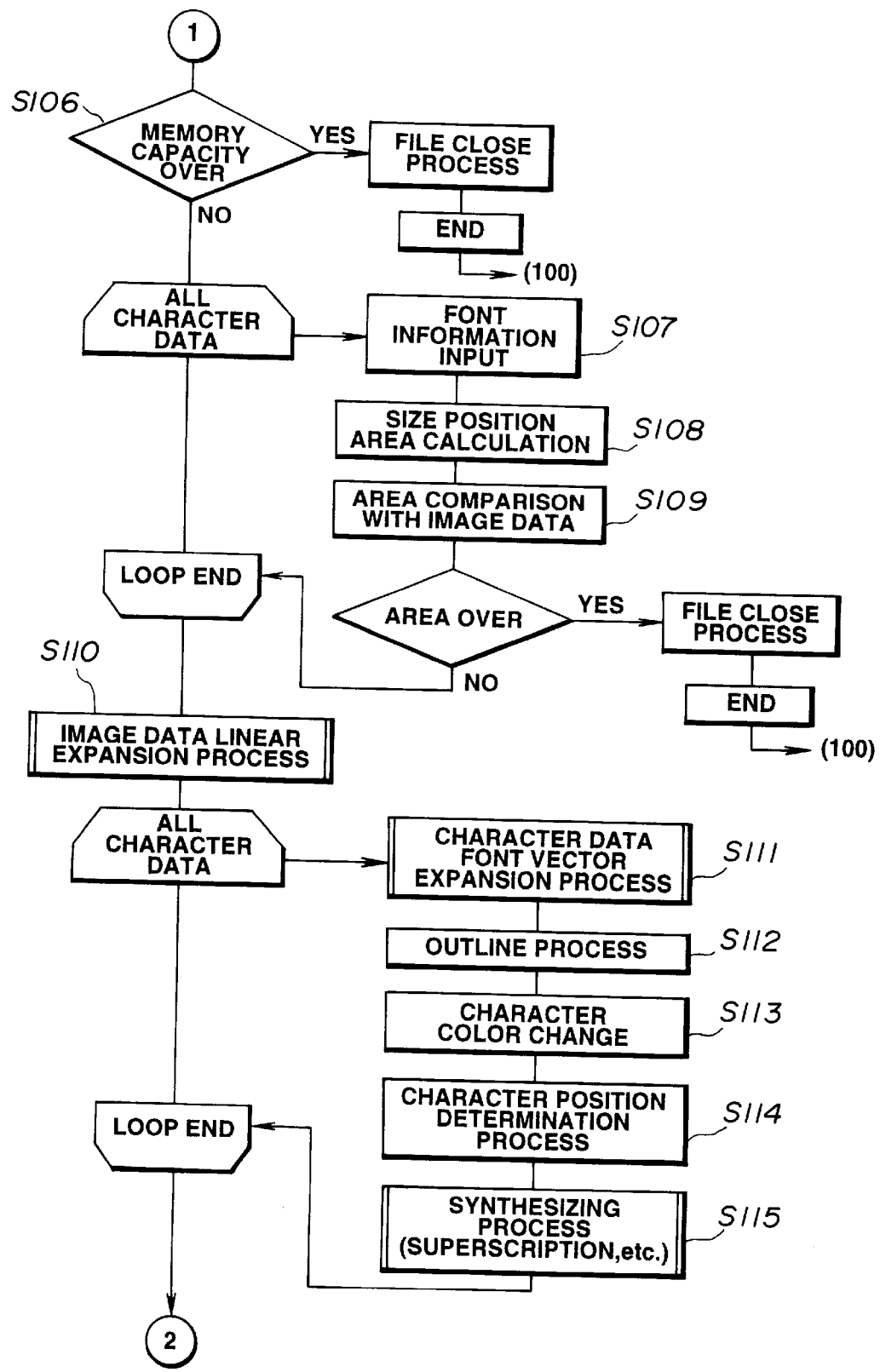
FIG. 5 is a flowchart showing the process of magnification and synthesis performed by the host computer in the image forming system.
Figure 6:
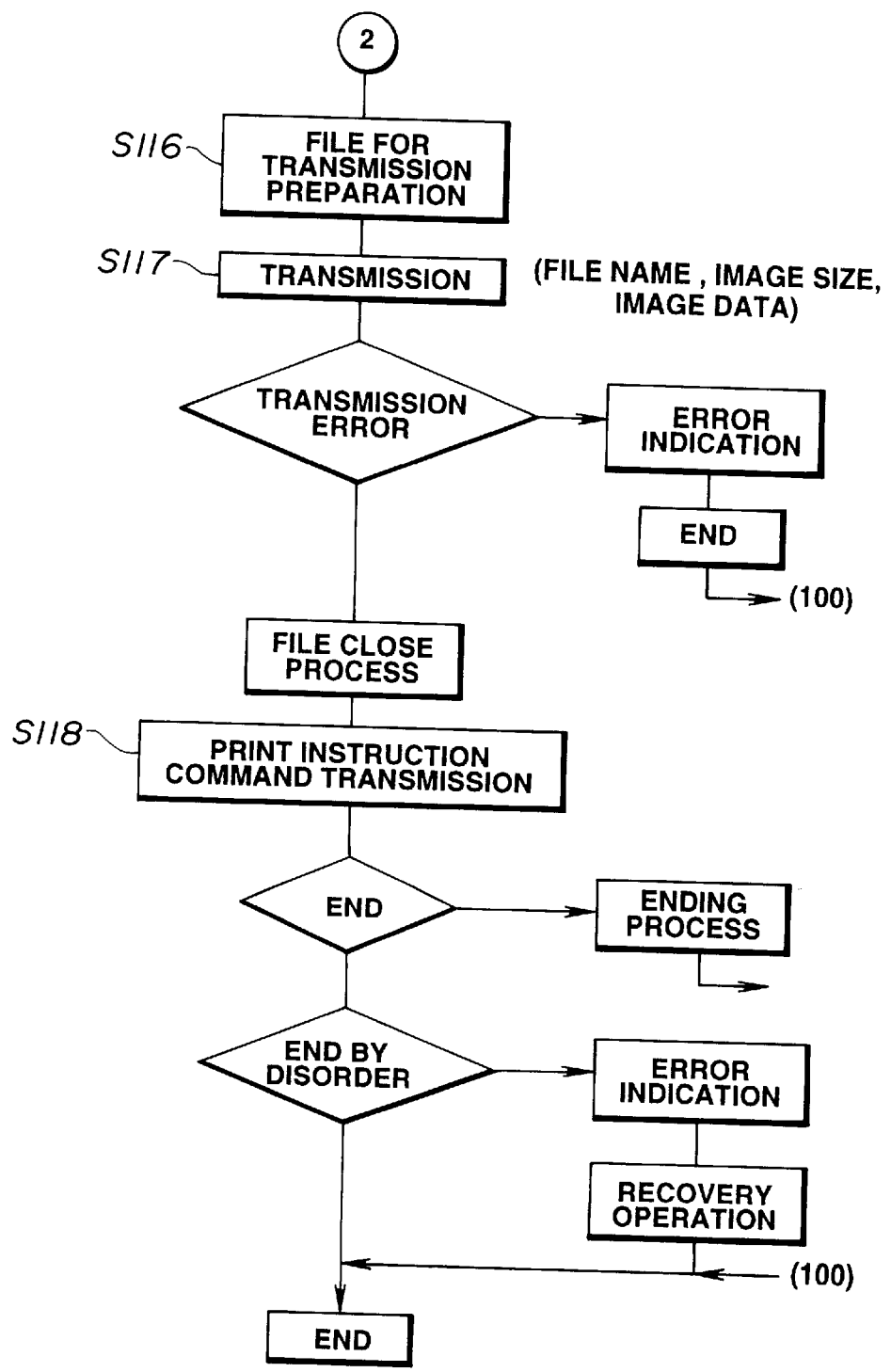
FIG. 6 is a flowchart showing the process of magnification and syntheses performed by the host computer in the image forming system.

Referring to FIGS. 5 and 6, after the image magnification (step S110) is finished, the character data information is input, and that data is vector magnified in accordance with the designated font type in the operation memory area and with the magnification rate (step S111).

Next, after shaping (outline shaping, for example) of these characters (step S112), character color change processing is performed (step S113), the font position is determined based on the position information (step S114), and image synthesis is performed by superscribing the character data onto the magnified image data (step S115).

By carrying out these steps on all characters, the image file is made (step S116), and the magnification processing in the host computer is finished.

Figure 10:
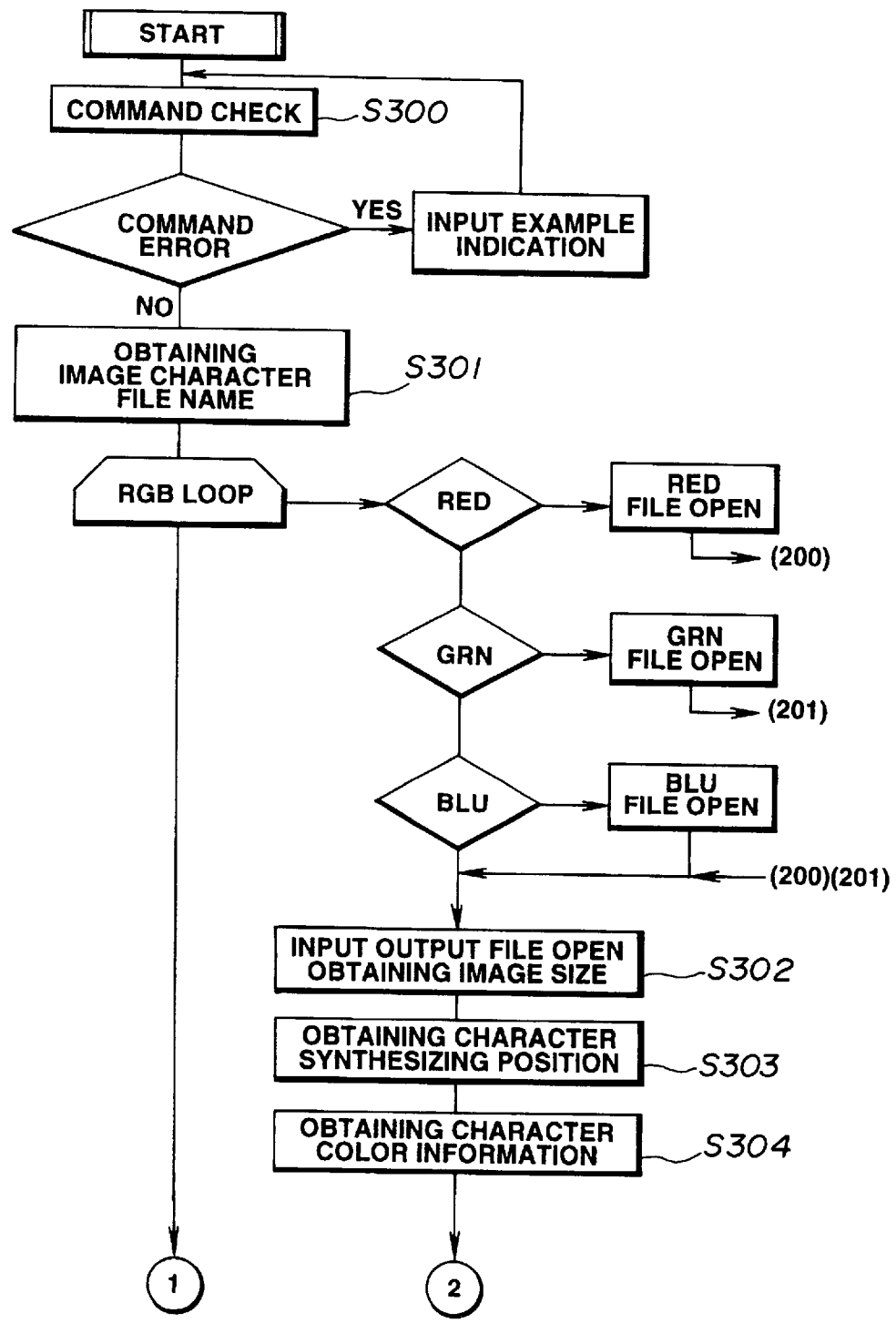
FIGS. 10 and 11 are flowcharts showing the synthesizing process.
Figure 11:
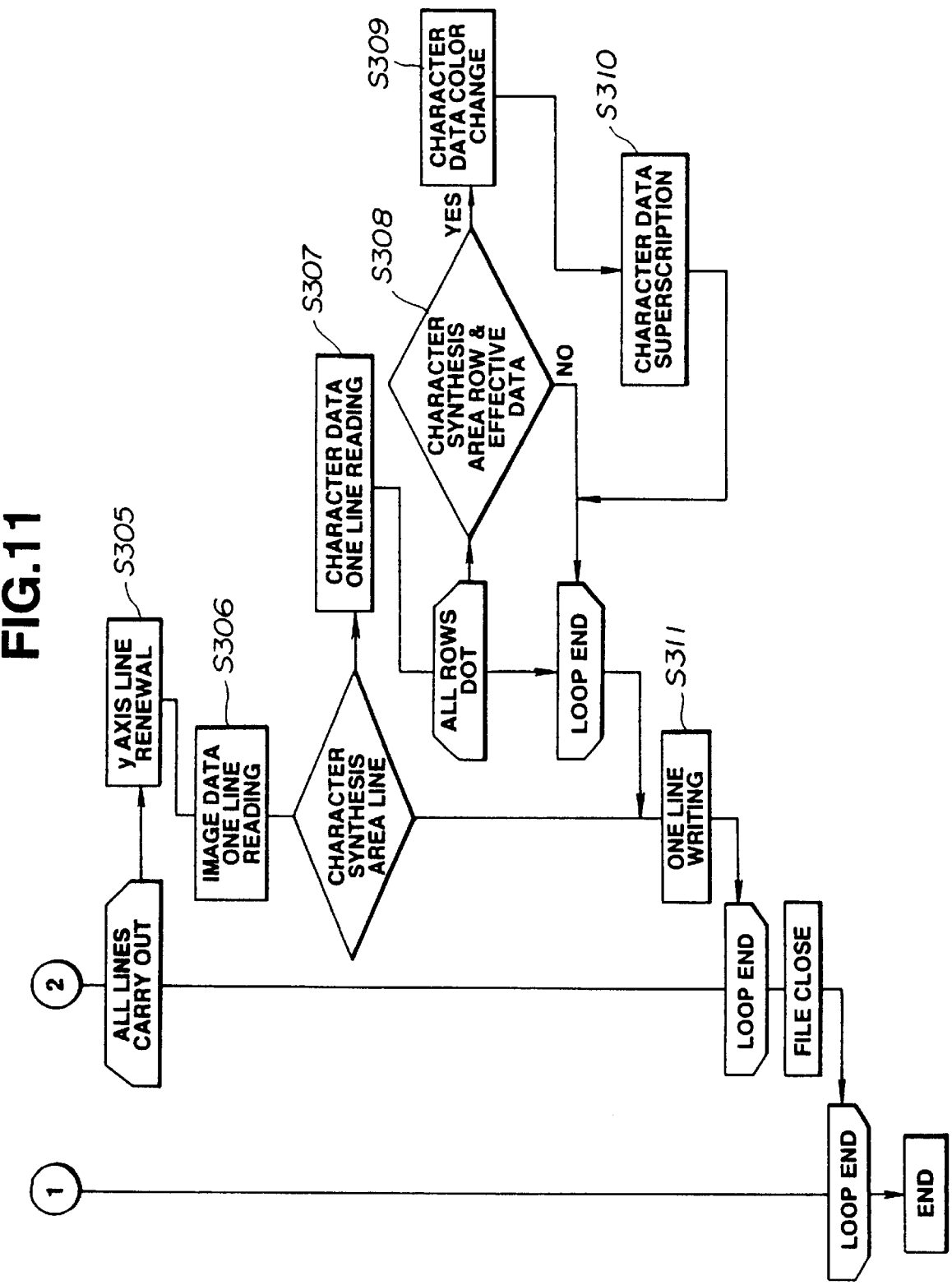

Synthesis in the above-mentioned step S115 will now be described in detail with reference to the flow charts of FIGS. 10 and 11. After the command is checked (step S300), the data file name is obtained (step S301), the image data is input, and the image size is obtained (step S302). Further, character synthesis-position information and character color information is obtained from the image format (steps S303 and S304).

Next, all lines in the image are renewed in turn from the image size (step S305), and image data for one line is input (step S306). Character data having a line area the same as that of the input image data is input for one line (step S307). Then the position of this line is transferred in the row direction, and judgment is made as to whether the row position is within the area of the character data and whether it is valid data (step S308). If it is judged that the row position is within the area of character data, the character data is transformed in accordance with the previous color information (step S309), and the character data is superscribed on the image data (step S310).

When the synthesis of one line is finished in step S310, the resulting data is input as new image data (step S311). These steps are carried out for all lines, and thus the synthesizing process is finished.

After the above-described data processing is completed, data is transmitted to the memory installed in the printer unit (step S117, FIG. 6). This transmission is performed by a save command. The transmission process is carried out by handshake, and the transmission operation is confirmed respectively by means of a confirmation code. Various attributes such as file name and image size (length×width pixel) are transmitted in order, and image data is transmitted.

The printer unit receives image data having capacity prescribed by the image size data, and finally transmits the confirmation code to finish the data transmission.

Other data attributes, such as a hard (i.e., hardware-executed) magnification rate, and print length, are transmitted by other instruction commands (step S118).

Figure 12:
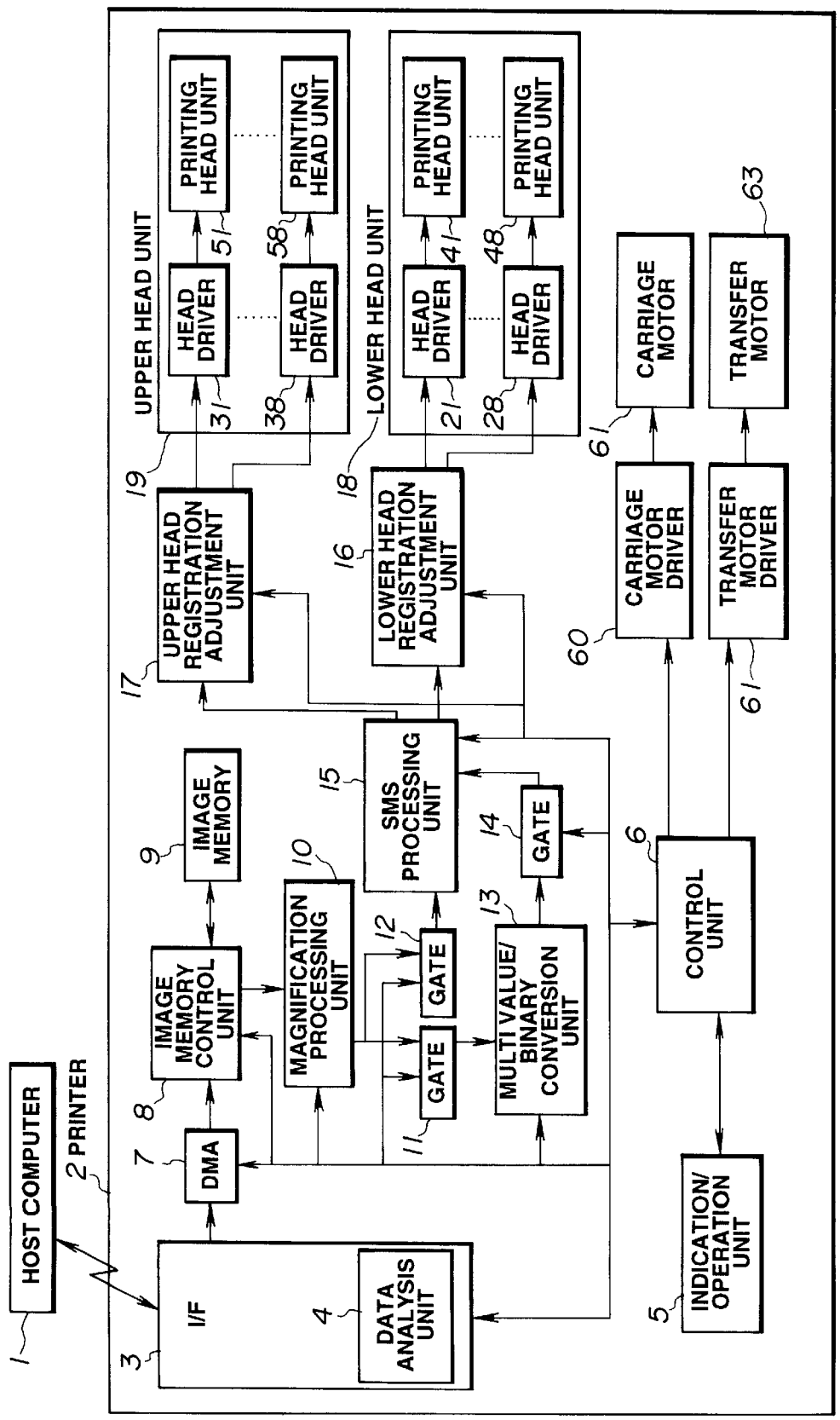
FIG. 12 is a block diagram showing the main construction of the printer in the image forming system.

FIG. 12 is a block diagram showing the principal construction of the printer 2 shown in FIG. 1.

In FIG. 12, the above-described host computer outputs various data/command such as the magnified and synthesized image data and the image format or the like to the printer 2 as mentioned hereinbefore.

In this printer 2, interface unit (I/F) 3, which performs communication control of data and command, has an analysis unit for analyzing the received data/command.

Image data received by I/F unit 3 is transmitted to the image memory control unit 8 through the direct memory access (DMA) control unit 7, and is stored in the image memory 9 through image memory control unit 8. This image memory 9 is comprised of semiconductor memory such as D-RAM (dynamic-random access memory) and/or S-RAM (static-random access memory).

The magnification processing unit 10 is comprised of hardware, and it performs magnification as described hereinafter on the image data output from the image memory 9.

The data processed by the magnification processing unit 10 is transmitted to the sequential multi-scan (SMS) processing unit 15 through gates 11 and 12 or through a multi-value/binary value transformer 13.

Ink discharge data respectively corresponding to the print heads of head unit 18 and 19 is processed by the SMS processing units 15. The processed data is further processed by an upper head registration adjustment unit 17 and a lower head registration adjustment unit 18 for adjusting the discharge position. The further processed data is supplied to the head units 18 and 19 respectively, and ink is discharged from the head units. Head drivers 21 to 28 and 31 to 38 drive corresponding print head units 41 to 48 and 51 to 58, and ink discharge is performed.

A carriage mounting the head unit is driven by a carriage motor 61 for moving.

A printing medium is transported driven by a printing medium transporting motor 63.

Controller 6 controls the operation and processing of the above-mentioned each unit in the printer, and also communicates the data with the indication/operation unit 5, which fulfills a function as an interface between an operator and the printer.

Figure 13:
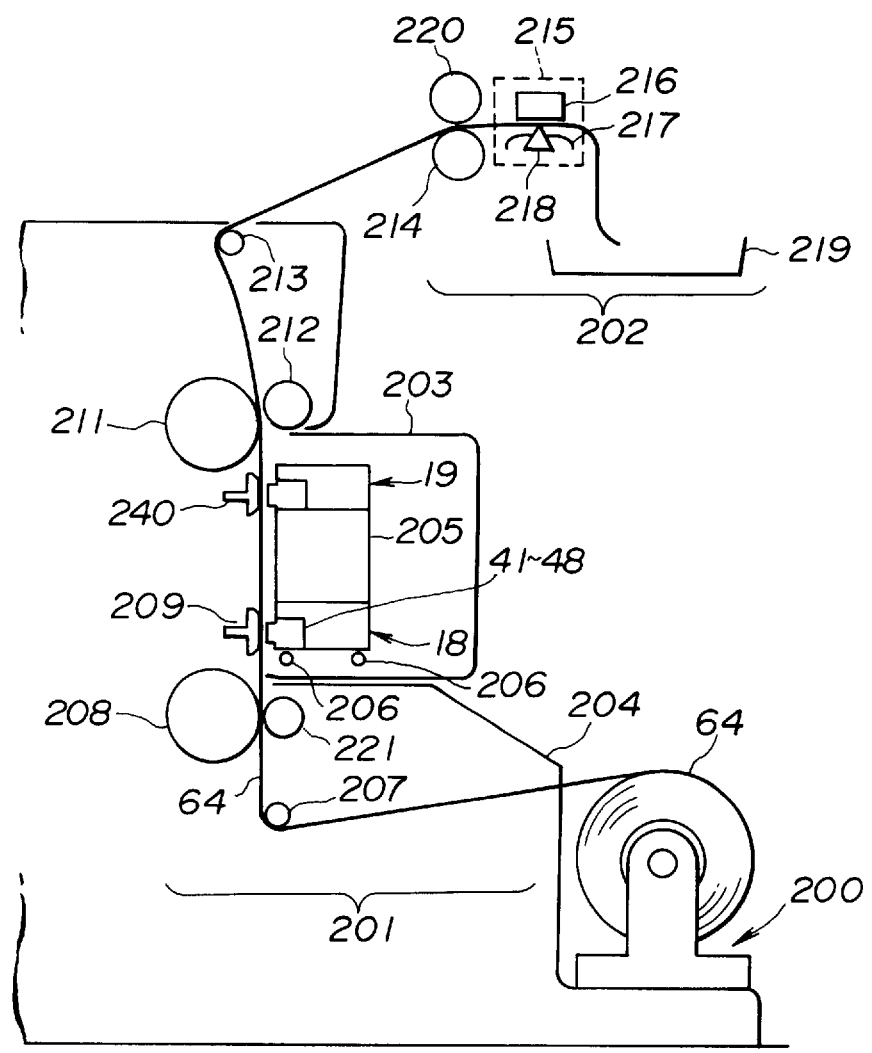
FIG. 13 is a cross-sectional view showing the mechanical construction of the printer.

FIG. 13 is a cross-sectional view showing the print operation portion of the printer 2 having the above-described construction.

The printer 2 mainly comprises a printing medium supplier 200 for supplying the printing medium 64, a feeder 201 for performing the precise stepwise conveyance of the supplied printing medium 64, a printer unit 203 for performing the printing by ink on the conveyed printing medium 64, and an ejection unit 202 for cutting and ejecting the printed printing medium 64.

The rolled printing medium 64 is conveyed to the feeder 201 from the supplier 200, guided by a guide roller 207 to pass through between a free roller 208 and a press roller 221, and guided by a lower platen 209 and an upper platen 240, and passes thorough between a drive roller 211 and a press roller 212, and is conveyed to the ejection unit 202 through a guide roller 213.

The printing medium 64 is fed stepwise by the drive roller 213 which is connected to a conveying motor 63, and the printing medium 64 is printed on by print heads 41 to 48 of the lower head unit 18 mounted on a carriage unit 205 which is supported by a rail 206.

The printing medium 64 is positioned by the lower platen 209 for printing.

The carriage unit 205 driven by the carriage motor 61 prints one line (one band; see FIG. 17) on the printing medium 64 by one go-and-return movement.

Figure 17:
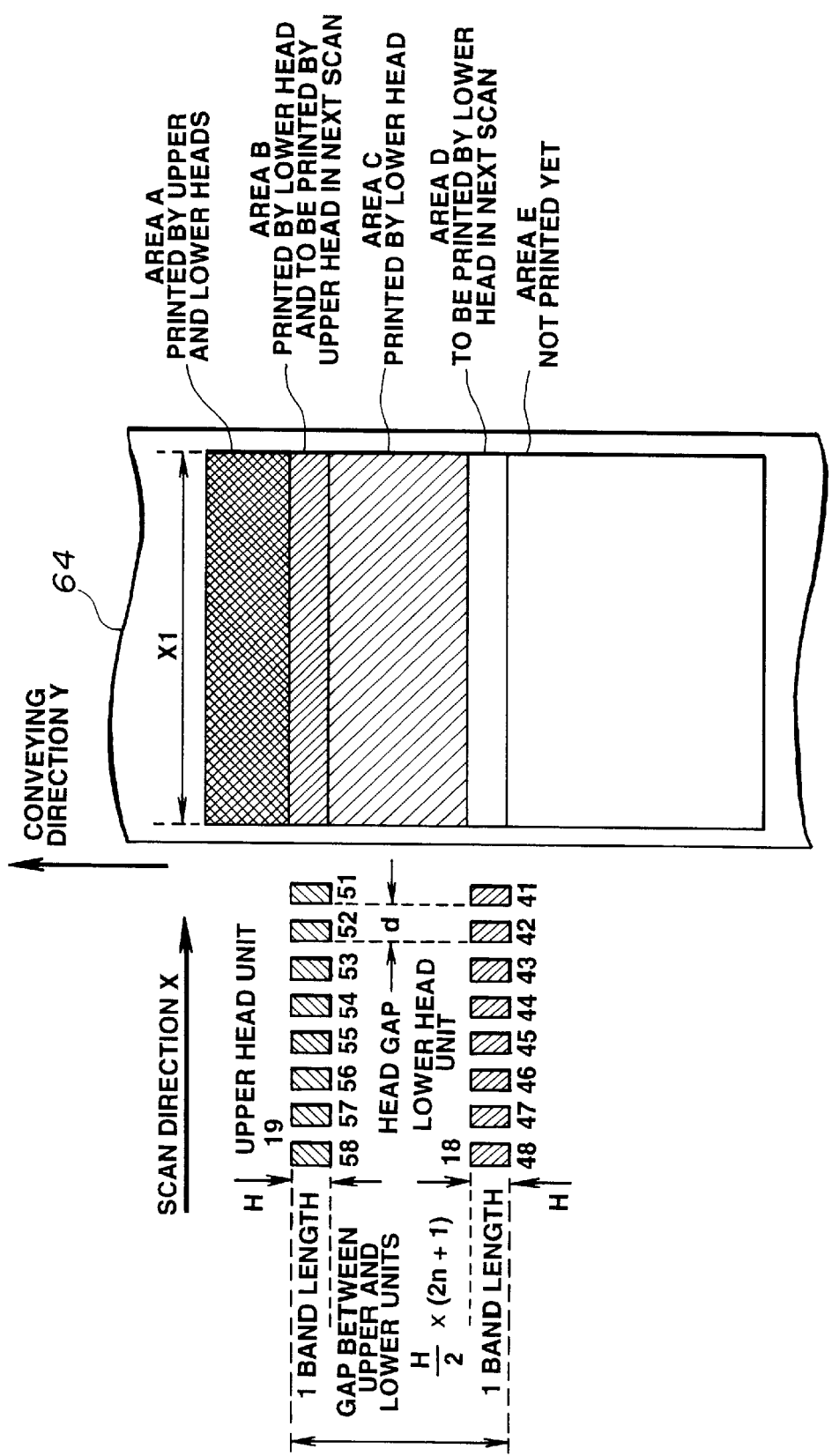
FIG. 17 is a view for explaining the positional relation between the print head unit of the printer and the printing medium.

Each time the printing of one band is completed, the printing medium 64 is fed stepwise by a predetermined amount, for example, by the width H of one band as shown in FIG. 17.

When the printing medium 64 is fed by a predetermined amount, for example, by a length n×H (n=1, 2, 3, . . . ), and the portion printed by the lower head unit 18 reaches the area of the upper platen 210, printing is performed by the printing heads 51 to 58 of the upper head unit 19.

When the printing operation is completed, the printing medium 64 is conveyed to the ejection unit 202 by the guide roller. In the ejection unit 202, the printing medium 64 is conveyed and supported by a conveyance drive roller 214 and a press roller 220, cut by a cutting unit 215 by a predetermined length, and ejected to a tray 219. This cutting unit 215 is composed of a platen 216, a cutting edge 218 and a pressing means 217.

Next, the operation of the printer 2 according to the embodiment shown in FIGS. 12 and 13 will be described with reference to a flowchart shown in FIG. 14.

When the printer 2 is turned on (step S1), the controller 6 performs an initial check and initialization of various hardware, such as the RAM, I/O unit, indication/operation unit 5, I/F unit 3 (including data analysis unit 4), DMA control unit 7, image memory controller 8, magnification processing unit 10, multi-value/binary value convert processing unit 13, SMS processing unit 15, lower head registration adjustment unit 16 and upper head registration adjustment unit 17, and also performs initialization of the mechanism (step S1).

This initialization is performed, for example, such that the conveyance motor 63, the carriage motor 61 and a motor in an ink discharge recovery system (not shown) are driven to move the upper head unit 18 and the lower head unit 19 to their home positions, and the recovery system for maintaining a stable ink discharge is operated, whereby ink is forcibly discharged from the ink jet heat units.

Controller 6 controls the channel of image data, that is, the opening and closing of the gate circuits 11, 12 and 14, and sets each parameter of the upper head registration adjustment unit 16 and the lower head registration adjustment unit 17, based on data stored in a ROM or in a back-up RAM installed in the controller 6.

Next, when the controller 6 detects that there is no error in each portion of the printer 2 (step S3), I/F 3 connected to the host computer 1 is enabled and a message indicating the stand-by condition, such as "READY", is displayed (or otherwise output) via the indication/operation unit 5.

If any portion in the printer 2 has an error, step S3 is repeatedly performed until the error is removed and the printer 2 is in the waiting condition.

Next, the controller 6 detects whether there is an input at the indication/operation unit 5 (step S4). When the controller 6 detects an input, the controller 6 performs various operations such as controlling the indication/operation unit 5, setting various parameters and storing data in a work RAM (step S5). After that, the process proceeds to step 3 and, if there is no input at the indication/operation unit 5 (step S4), the process proceeds to step S6.

In step S6, the controller 6 and the data analysis unit 4 detect whether the signal is input from the host computer 1, and if they detect such signal in the I/F unit 3, the process proceeds to step S7, while if they do not detect such signal, the process proceeds to step S3.

In step S7, the data analysis unit 4 discriminates the kind of the input command (image transmission command, print command, continuous print command, etc.), and each command operation is performed. For example, if the command is the image transmission command, the receiving and storing of the image data is performed in step S8, and the process returns to step S3.

If the command is a print command, the print operation is performed (step S9), and a final-line printing by the upper head unit 19 is performed (step S10). Then, initialization and end processing of the image processing unit such as the image memory control unit 8, multi-value/binary value convert processing unit 13 and the upper head registration adjustment unit 17 are performed (step S11), and the process returns to step S3.

If the command is a continuous print command, a printing operation similar to step S9 is performed (step 12), and the process returns to step S3.

If the command is some other command, the operation corresponding to the command is performed (step S13), and the process returns to step S3.

Figure 15:
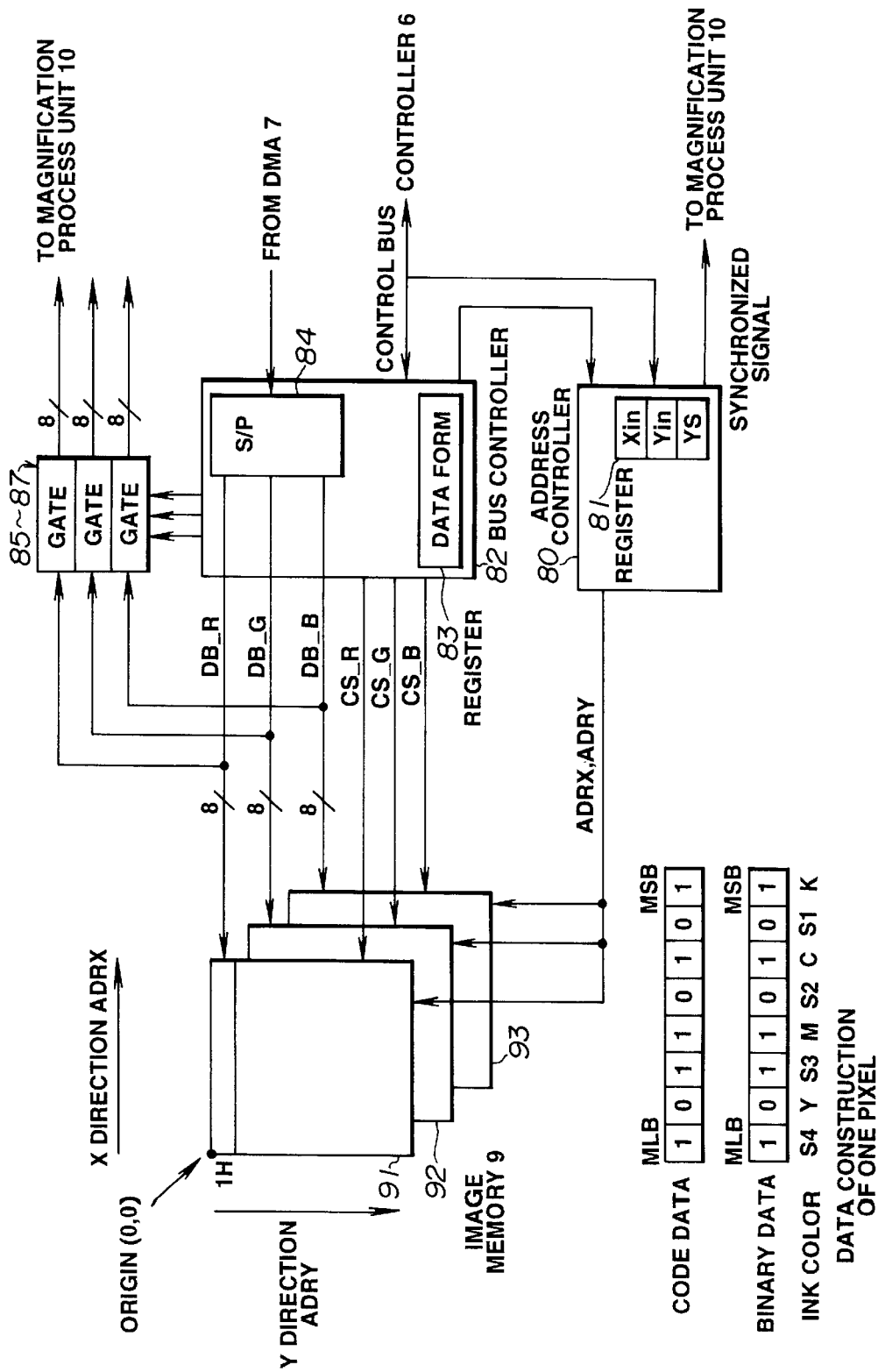
FIG. 15 is a view for explaining the construction of the image memory in the printer and the relation between multi-value data and binary data.
Figure 16:
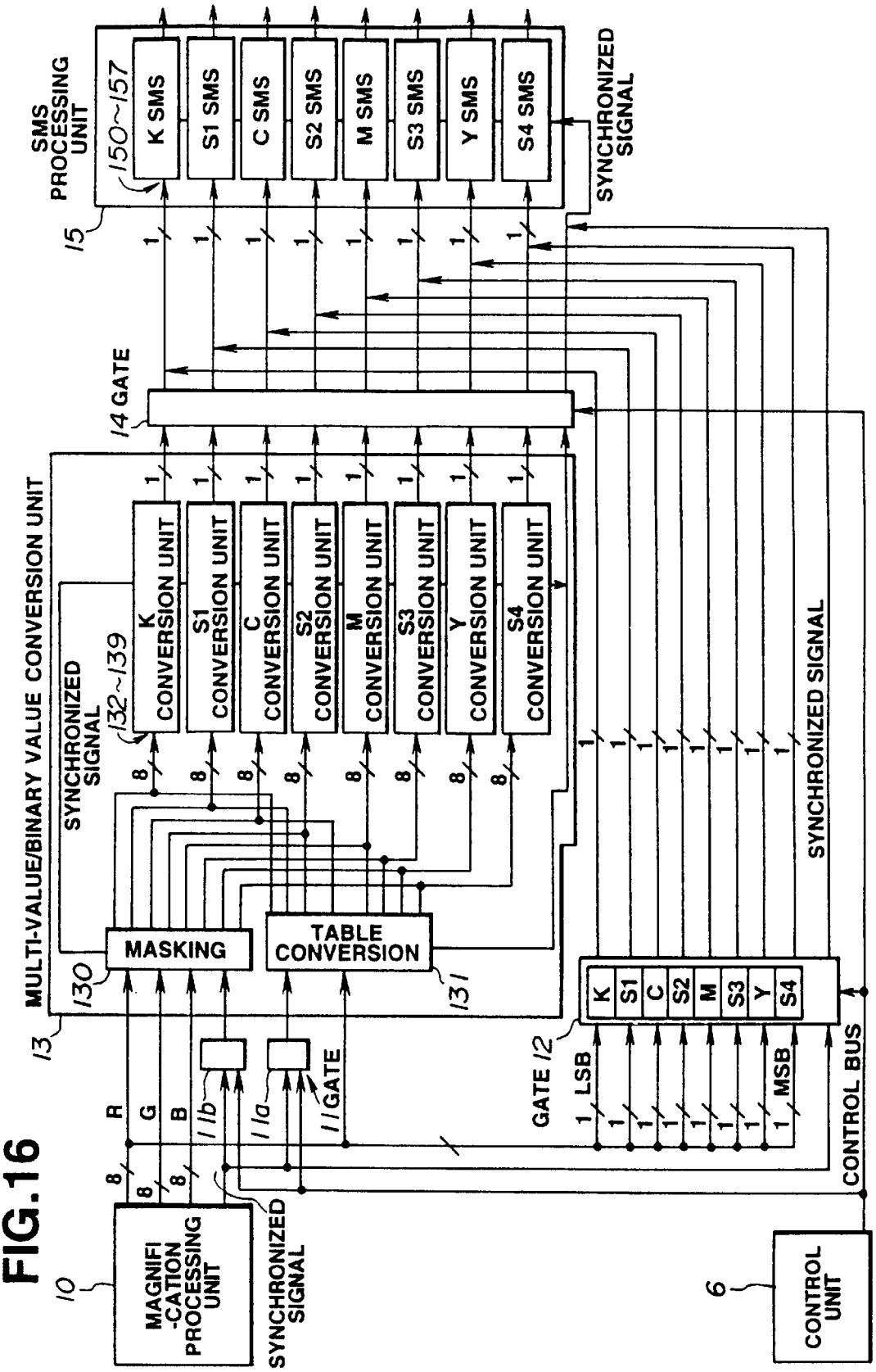
FIG. 16 is a block diagram for explaining the change of image bus in correspondence with the multi-value data and binary data in the printer.

The above-described image data receiving and storing will now be described with reference to FIG. 15, which is a block diagram explaining details of the image memory control unit 8 shown in FIG. 12.

An image transmit command is comprised of a command part and a parameter part, and the parameter part is comprised of an image size (Xin, Yin) and an image file name with magnification factor, etc. Following the image transmit command, the image data corresponding to the image size (Xin, Yin) is continuously transmitted. The data form of the image data is determined by the magnification factor of the image file name.

For example, if the data form of the input image data is three-stimuli values (R.G.B.), the host computer affixes the magnification factor [.RGB] to the image file name; if the input image data is code data, the host computer affixes the magnification factor [.P] to the image file name; if binary value data, the host computer affixes the magnification factor [.]; and in each case the image transmission command (for example, SAVE, TEST.RGB, 256, 256) is output to the printer 2.

When the printer 2 receives this image transmission command, the controller 6 determines the data form of the image data based on the magnification factor of the image file name and stores it in the internal work RAM (not shown) after coding it.

With this, coded image data and data form are transmitted to the image memory controller 8, and the image memory controller 8 stores the image size (Xin, Yin) in the register 81 of the address controller 80, and stores the data form in the register 83 of the bus controller 82.

If the data form stored in the register 83 denotes multi-value data, the bus controller 82 enables the signals of the chip select C_R, C_G, C_B of image memories 91, 92 and 93, and also enables the serial/parallel convert unit 84 (S/P). Thus, if the image data (R, G, B) is transmitted by pixel serial form from the DMA controller 7, this data is distributed by the S/P 84 and is transmitted to the image bus DB_R, DB_G, DB_B.

The address control unit 80 stores the data of the image bus DB_R, DB_G, DB_B in the same address (ADRX=0, ADRY=0) of each image memory 91, 92, 93, and increase the address ADRX by +1, and stores the image data (R, G, B) of the next pixel image data in the next address (ADRX=1, ADRY=0), and when the image data corresponding to one raster (Xin pixel) is stored, the address controller 80 increases the address ADRY by +1 and stores the image data of one page (Xin×Yin pixels) simultaneously.

If the data form stored in the register 83 denotes code data or binary data, the bus controller 82 makes just the chip select C_R signal of the image memory 91 effective, and does not make S/P 84 effective. In this fashion, when the image data (code data) is transmitted from the DMA controller 7 in pixel-serial manner, S/P 84 transmits this data to the image bus DB_R, and the address controller 80 performs the similar address control and stores the code data or binary data of one page in the image memory 91 by bit construction in units of one pixel. Since the increment of address is performed at each one pixel, the speed of increment is about three times as fast as in the case of using multi-value data. (Strictly, since the transmission from the host is not performed perfectly in synchronism, the ratio is not exactly three.)

When the image data is stored, gates 85 to 87 are closed, and some of the synchronized signals such as a band enable signal BVE, a video enable signal VE and an image clock CLK are not being output from the address controller 80. Therefore, when the image data is stored, the image data is not output to the magnification processing unit 10, and the image data on the input image bus of the magnification processing unit 10 is not effective.

When the enable signals BVE=1 and VE=1, the image data is effective and is transmitted with the image clock.

The above-described printing operation will now be described with reference to FIGS. 12 and 15 to 17.

When the controller 6 receives the print command or the continuous print command, the controller 6 determines the magnification rate of the magnification processing unit 10 based on another command in the image format, and determines the flow of the image data including the synchronized signal. Then, the controller 6 changes the image memory controller 8 from the image storing mode to the outputting mode. Gates 85 to 87 are opened, S/P 84 is closed and the selector signals C_R, C_G and C_B are in the same positions as in the case of image storing.

Simultaneously, initialization (ADRX=0, ADRY=0, Ys=0 in the address controller 80) and determination of print mode (output six (X out, Y out) instructed by another command is set in the register 81 in the address controller 80) is performed. Image data for one band is output from the image memory 9 in turn with the same timing of the movement of the carriage motor 61, and printing of one band is performed by the lower head unit 18.

When the data form stored in the image data denotes multi-value data, controller 6 closes the gate 11a of the gate 11 and gate 12 and opens the gate 11b of the gate 11 and gate 14, and therefore, image data (R, G, B) output from the magnification processing unit 10 is converted to multi-value data of each ink color (K, S1, C, S2, M, S3, Y, S4) by the masking processing unit 130. Next, the multi-value data is converted to binary data of each ink color (K, 1, C, 2, M, 3, Y, 4) by the ink color (K, 1, C, 2, M, 3, Y, 4) converting units 132 to 139, and is output to the SMS processing unit 15.

When the data format is code data, the controller 6 closes gates 11b and 12 through the control bus, and opens gates 11a and 14, and therefore, the code data is converted to multi-value data of each ink color by the table conversion processing unit 131, and is processed by the same process as in the case of multi-value data.

Further, when the data format of the image data is binary data, the controller 6 closes gates 11a, 11b and 14 through the control bus, and opens gate 12, and therefore, the binary data of each ink color output from the magnification processing unit 10 is output directly to the SMS processing unit 15.

The binary data obtained by the above-mentioned each process is input to the SMS processing unit 15, and processing is performed by the SMS processing parts 150 to 157 corresponding to each ink color in the SMS processing unit 15. In this manner, binary data for the lower print head units 41 to 48 and binary data for the upper print head units 51 to 58 is obtained, and is transmitted to lower head registration adjustment unit 16 and upper head registration adjustment unit 17.

The lower head registration adjustment unit 16 stores such binary data of each ink color in each memory having the capacity of one band at the same time, and the beginning time to read each memory having the capacity of one band is delayed in order to adjust the registration in the scanning direction X while the K print head 41 is the basis, and the binary data is transmitted to head drivers 21 to 28 of each color ink.

On the other hand, the upper head registration adjustment unit 17 also stores the binary data of each color in each memory having a capacity of one band simultaneously; however, the image data of this first band has not been output yet at this point.

After printing the image of one band on the printing medium 64 by one scanning, carriage motor 61 is reversely rotated and the carriage unit 205 is moved to the print beginning position, that is, the position closer to the left end of the printing medium 64 than the home position.

Then, in order to print the next band, the transfer motor 17 is rotated by a predetermined amount to transfer the print medium 64 in the direction of Y by the length of printed one band H, and the image printing of the next band begins.

In the image forming process of the following band, the controller 6 informs the image memory control unit 8 of the output addresses, that is, the front address Y where the image data to be output is stored, and the controller 6 transmits the print start command to the image memory control unit 8 through the control bus, by which the image corresponding to the new band is printed.

The amount of increment in the head address Y depends on the magnification processing, and when it is the equal-size rate (100%), the pixel number corresponds to the band size 1H.

When the image is printed in order by forming one band by scanning it with the above-mentioned timing, as shown in FIG. 17, if the gap between the lower head unit 18 and the upper head unit 19 is Hx(2N+1)/2, the lower head unit prints N bands, and by starting the next band printing, image data of each color corresponding to a half band in the direction Y from the upper head registration adjustment unit 17 is input while K is the basis, and the printing by the upper head unit is performed.

When the controller 6 detects the end of printing of the designated bands, the controller 6 stops the printing operation.

To simplify the explanation, Yout is treated as a multiple of the pixel number H. In the print ending stage, as shown in FIG. 17, area A has already been printed by both upper and lower head units 18 and 19, areas B and C (Hx(2n+1)/2 have been printed by just the lower head unit 18, and areas D and E have not been printed.

When the print operation is performed based on the print command, next, final-line printing is performed and the image processing unit is initialized, and then, the printing operation returns to the stand-by state.

Final-line printing means that areas B and C printed by just lower head unit 18 are now printed by the upper head unit 19, during which the lower head unit 18 does not print, whereby the image including the final line is printed by both of upper and lower head units 18 and 19.

Initialization of the image processing unit is the process by which the memory storing the intermediate data of image processing or image data and address control for indicating the memory are cleared.

In this embodiment, the process performed by the multi-value/binary value conversion unit 13 and the upper head registration adjustment unit 19 corresponds to the initialization process.

In the multi-value/binary value conversion unit 13, the error diffusion method, which is one known area gradation methods in a quasi-halftone process, is adopted. In the error diffusion method, after one band is printed, error data which is to be diffused to the next band is stored in a memory, by which a continuous image is obtained. However, this process is not necessary after the normal printing including the final-line printing based on the print command ends, and is also not necessary for the printing of the next new image data, and therefore in such case the memory is cleared.

Further, image data stored in a memory of the upper head registration adjustment unit 19 is also not necessary, and therefore, the address control portion of the memory is cleared.

On the other hand, when the command is the continuous print command, after the print operation is completed, the final-line printing is not performed and the initialization of the image processing unit is not performed, and the printing operation returns to the stand-by state to prepare to receive the next image data.

When the command is the image transmission command again, the image data is stored. When the command is the continuous print command, the print operation is performed successively, and therefore the continuity of image processing is maintained. The continuity of the image data is maintained if the transmitted image data is continuous. By repeating this process, different continuous image can be printed continuously.

When the continuous printing is finished, the print command is transmitted with the final image transmission data, and thereby the print operation, final-line printing and the initialization of the image processing unit are performed and the printing operation ends.

Now, processing performed by the above-mentioned magnification processing unit 10 will be described with reference to FIG. 18.

Figure 18:
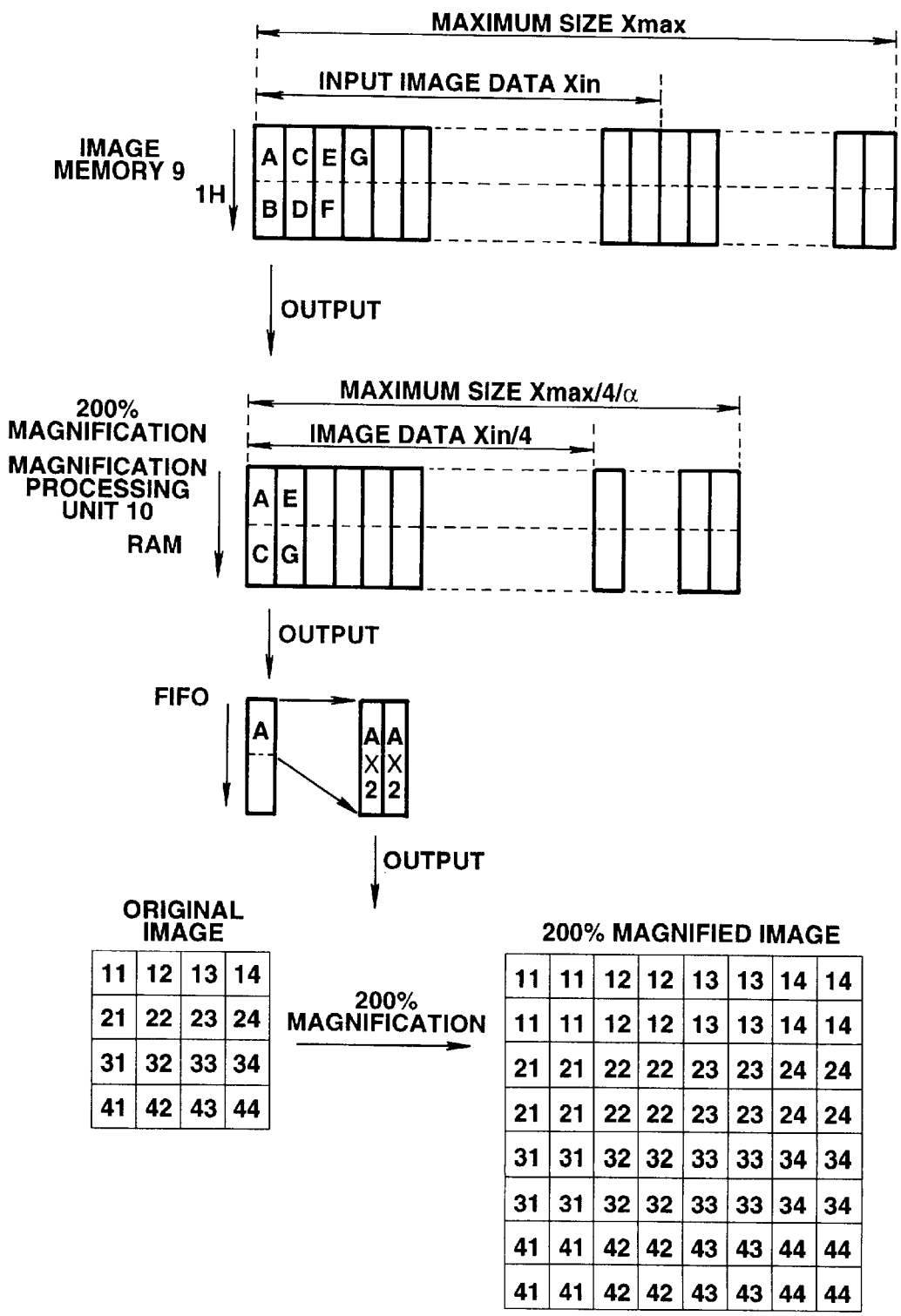
FIG. 18 is a view showing the process performed by the hard magnification processing unit of the printer.

According to the embodiment shown in FIG. 18, the magnification rate is 200%. In this magnification process, in order to get by with only small hardware structure and yet achieve high processing speed, magnification is accomplished by the repetition of a single pixel. For example, when a portion of the original image comprised of 4 pixels×4 pixels is magnified to 200% to produce a magnified image comprised of 8 pixels×8 pixels, each pixel of the original image is used twice horizontally (X) and then twice vertically (Y) respectively, so that 4 (2×2) pixels having the same data value are obtained.

According to this 200% magnification process, input image data having the size of X in the direction of X is stored in a memory (maximum size: X max) having a capacity of one band of the image memory 9 (portion 91 as shown in FIG. 18).

Image data corresponding to the band length is output by turns of A, B, C, D, E, F, G, . . . from the image memory 9 to the magnification processing unit 10. The magnification processing unit 10 stores a half band length (when the magnification rate is 200%) in the RAM in the order A, C, E, G. . . . , and reads image data of A with a small delay and outputs it to a FIFO register of the magnification processing unit 10.

The FIFO register stores the image data A and reads it with a small delay at half the speed of the image clock CLK, whereby it magnifies the image data A by two vertically.

After that, the reading point of the FIFO register is returned to the first point, and the image data of A is read at half the speed of the image clock again, whereby the image data of A×2 is also magnified horizontally.

After completing the 200% magnification of the image data A, image data C is input in the FIFO register from RAC and is similarly processed to perform 200% magnification of image data C.

Similarly, 200% magnifications of half band length×X of image data E, G, . . . are performed, and one band of image data is printed.

Next, the read start address Y of the register 81 in the address control unit 80 of the image memory controller 8 is increased by half a band length of pixels, by which one band of image positioned half a band length ahead in the direction Y is similarly read from the image memory 9, and 200% magnification processing is similarly performed.

The magnification processing unit 10 can perform magnification at an output size of 100% (same size), 200%, 400%, 800%, 1600%, . . . , that is, $100\% \times 2^n$ (n=0, 1, 2, 3, . . . ), by repeating one pixel for obtaining 1, 2, 4, 8, 16, . . . pixels.

In this process, band length stored in the RAM of the magnification processing unit 10 is also varied to one band, a half band, a fourth of a band, an eighth of a band, a sixteenth of a band . . . , and the reading speed of the FIFO is varied to the same, a half, a fourth, an eighth, a sixteenth, . . . , of the image clock, and the reading number of times of the FIFO is also varied to 1, 2, 4, 8, 16, . . . , and reading start address Y of the image memory control unit 8 is increased by one band, a half band, a fourth band, an eighth band, a sixteenth band . . . of a pixel, whereby the magnification process can also be performed.

Figure 20:
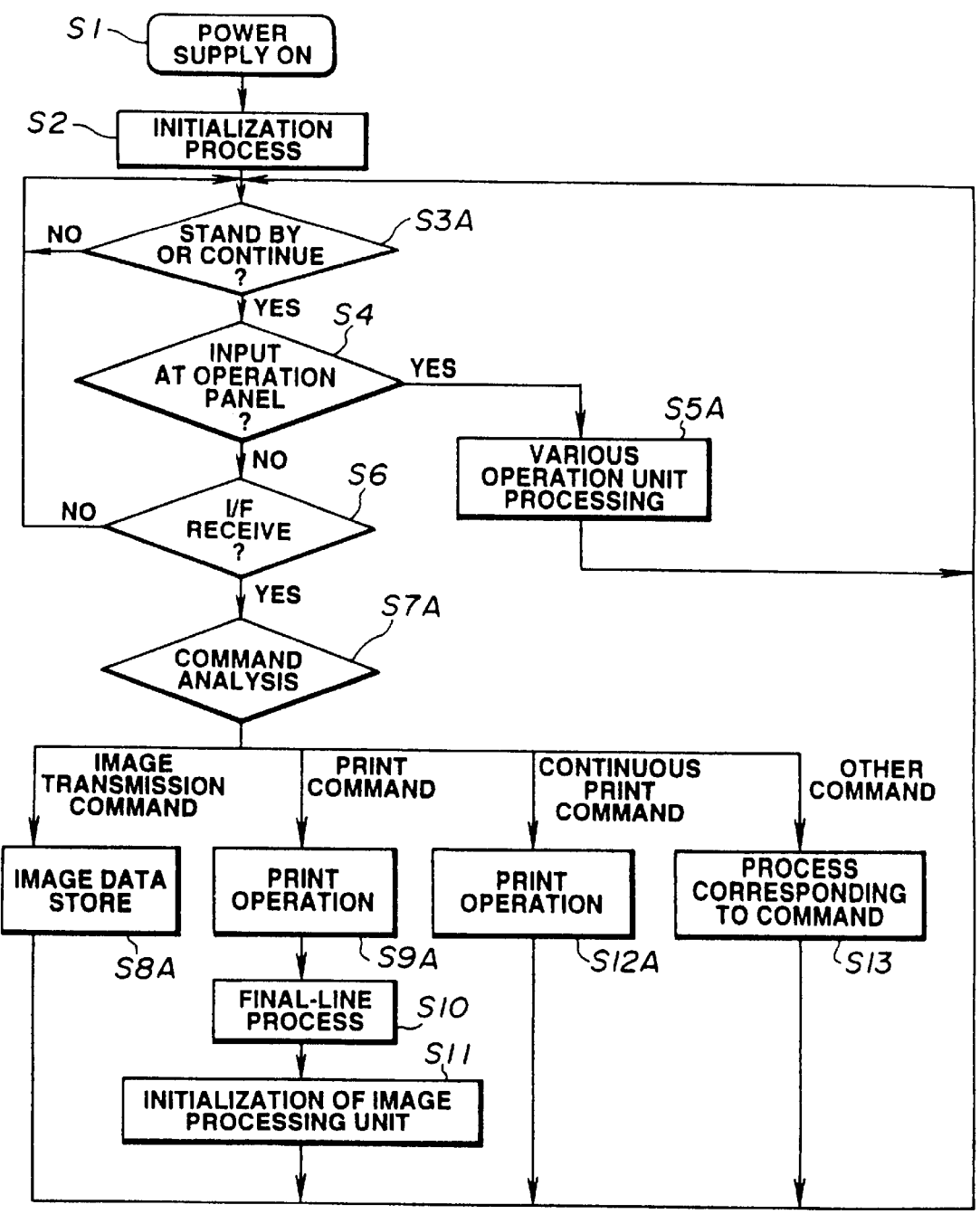
FIG. 20 is a flowchart showing the operation of the printer according to another embodiment of this invention.

The operation of the image forming apparatus according to another embodiment is shown in FIG. 20. Since the operation of this embodiment is similar to what is described above, only the differences from the operation shown in FIG. 14 are described.

Figure 14:
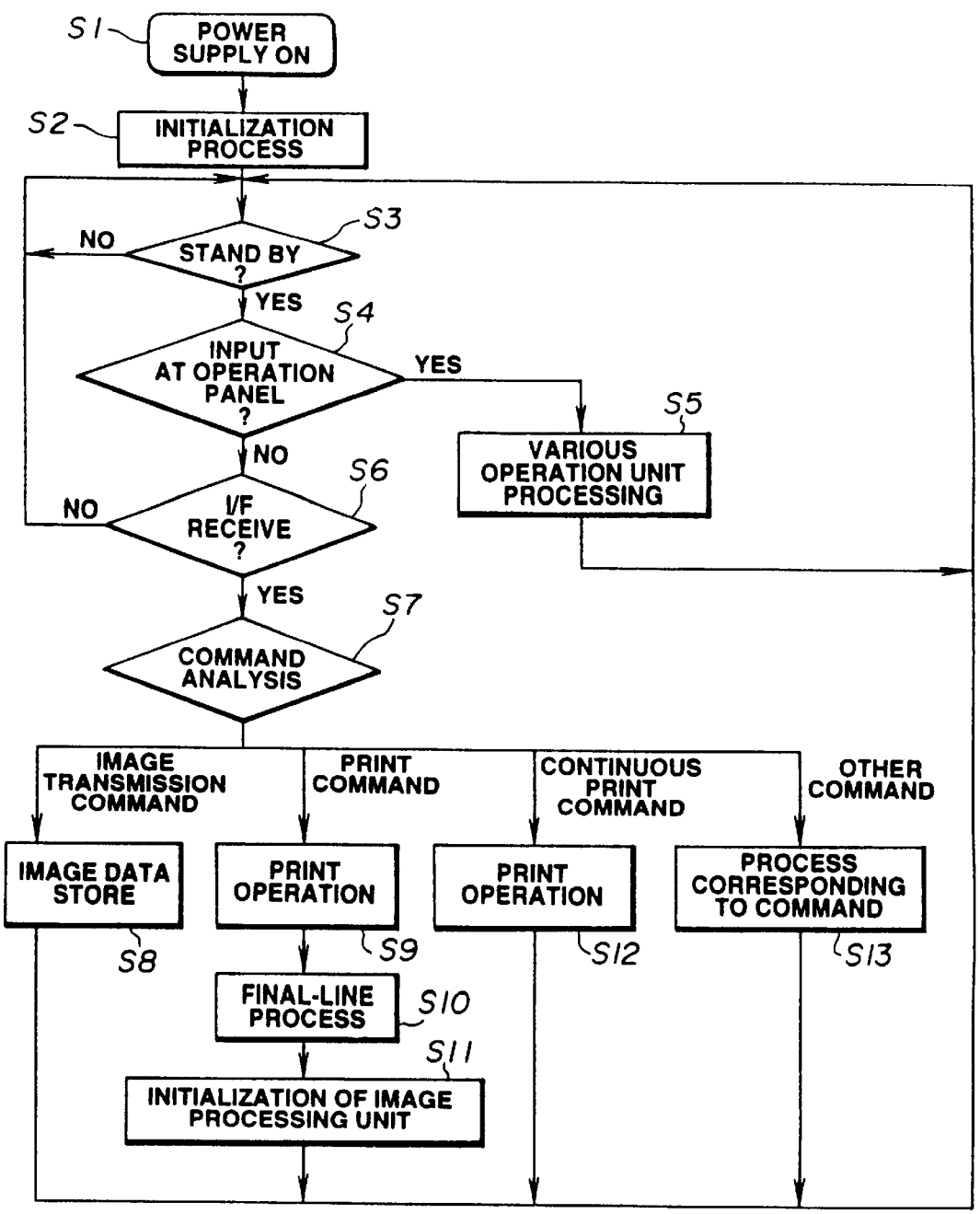
FIG. 14 is a flowchart showing the operation of the printer.

Step 3 of FIG. 14 is changed to step 3A, which, when the machine is in the stand-by condition ("Ready" is indicated on the indication/operation panel 5), or when it is printing ("continue" is indicated on the indication/operation panel), the operation advances to step 4.

Step 5 is changed to step 5A, in which a similar operation is performed during the stand-by condition. However, when the machine is in a printing condition, any change of parameters which concern the printing operation is prohibited. That is, some operations are restricted to work, and any command to change the parameters is disregarded.

Step 7 is changed to step 7A, in which a similar operation is performed in the stand-by condition. When the machine is printing, and the command analyzed by the data analysis until 4 (see FIG. 21) is a print command or a continuous print command, it is discriminated whether the image data to be printed is stored or not. If storage has not been completed yet, the command is disregarded, and the host apparatus is notified though I/F unit 3 that the command has been disregarded.

On the contrary, if the storage of image data to be printed has already been completed, the print command or the continuous print command is accepted.

While the machine is in the continuous printing operation or printing operation, if the command analyzed by the data analysis unit 4 is an image transmission command, the control unit 6 discriminates whether it is receivable or not on the basis of the vacant area of the image memory 9 and the image size ($X_{in}$, $Y_{in}$) of the image data to be transferred. (The above-mentioned "vacant are" means the memory area where neither image data being printed nor image data to be printed are stored.)

When it is a discriminated that receiving the data is not possible, the image transmission command is disregarded, and the host apparatus is notified through the I/F unit 3 that the command has been disregarded.

Step 8 is changed to step 8A. With respect to image transmission from the stand-by condition, similar to the above-described embodiment, image data (R, G, B) from DMA 7 is distributed as image data DB_R, DB_G and DB_B by a bus controller 82, and these sets of image data are stored in the image memories 91A to 93A through the gate 88A, which is open because the gate signal ENBA is active. Address controller 80A generates addresses of image memories 91A to 93A in the same manner as in he above-mentioned embodiment. Gates 85A to 87A and 85B to 87B are closed. The address controller 80B is in a clear condition and in an interrupted state, and the gate 88B is closed because the gate signal ENBB is not active.

When image data being printed or image data to be printed is being stored in the image memories 91A to 93A, in order to store the image data, image data (R, G, B) from DMA 7 is distributed as image data of DB_R, DB_G and DB_B by the bus controller 82, and these sets of data are stored i the image memories 91B to 93B through the gate 88B, which is open because the gate signal ENBB is active. Similarly as above, address controller 80B generates addresses of the image memories 91B to 93B in the same manner as in the above-mentioned embodiment, and gates 85B to 87B are closed. The gate 88A is closed, because gate signal ENBA is not active.

Steps 9 and 12 are changed to steps 9A and 12A.

The image printing operation started from the stand-by condition is performed in the same manner as in the above-mentioned embodiment: that is, the addresses are generated from the address controller 80A and image data (R, G, B) are outputted from the image memories 91A to 93A through gates 85A to 87A. Gate 88A is closed.

When the printing operation using the image data from image memories 91A to 93A is finished and storage of the image data in the image memories 91B to 93B is finished and the print command or the continuous print command is transmitted, the address controller 80B generates addresses and the image data (R, G, B) is outputted from the image memories 91A to 93B through gates 85B to 87B. Gate 88B is closed.

As described in the foregoing, by constituting the image memory 9 which double memories such as image memories 91A to 93A and image memories such as image memories 91B to 93B, and by performing control of the input bus and output bus, control of input address and control of output address separately, receiving the data during the printing operation can be performed.

According to this invention, if the time taken to receive the image data to be printed next is less than that taken in the present printing operation, the interruption time period can almost be zero.

What is claimed is:

1. An image forming apparatus for forming an image on a recording medium during plural scannings of a recording means in accordance with image data, said image forming apparatus comprising:

recording means having plural recording elements;

main scanning means for scanning said recording means relative to the recording medium;

receiving means for receiving image data from a host apparatus;

memory means for storing the image data received by said receiving means;

subscanning means for conveying the recording medium in a direction almost perpendicular to the scanning direction of said main scanning means;

recording control means for controlling such that recording areas recorded by plural scannings of said recording means by said main scanning means are overlapped with each other and an image of a predetermined area is commenced by plural scannings of said recording means; and control means for controlling such that image data corresponding to a predetermined amount of an image is received, the received image data is stored in said memory means, an image is formed by said recording control means, then recording is interrupted before completion of a predetermined number of scannings of at least the predetermined area by said recording means, and then image data of an image which is contiguous to the image indicated by previously received image data is received.

2. An image forming apparatus according to claim 1, wherein said control means performs print interruption only when a predetermined command is transmitted from the host apparatus.

3. An image forming apparatus according to claim 2, wherein commands transmittable from the host apparatus include one command concerning a first print mode, in which printing is not interrupted, and a second command concerning a second print mode, in which printing is interrupted, and wherein said predetermined command is said second command.

4. An image forming apparatus according to claim 2, wherein said control means cancels the print interruption by an instruction of printing mode or an instruction for starting the printing, from said host apparatus.

5. An image forming apparatus according to claim 1, wherein said receiving means is also for receiving and for identifying an image data transmitting signal, a designation signal for designating print mode, and an instruction signal to start printing, from said host apparatus.

6. An image forming apparatus according to claim 5, wherein said host apparatus has a function to detect end of printing after sending the image data transmitting signal, the designation signal and the instruction signal to start printing.

7. An image forming apparatus according to claim 1, wherein the recording means changes a state of ink by heating, and discharges the ink as a result of the change of state.

8. An image forming apparatus according to claim 1, wherein said memory means has at least two memory areas, and said control means controls said receiving means and said memory means such that when the image data is transferred from the host apparatus whether the printing operation is being performed or not, the image data is stored in one of said memory areas which is not storing the image data for printing.

9. An image recording method for an image recording apparatus for recording an image on a recording medium during plural scannings of a recording means in accordance with image data, comprising the steps of:

receiving image data corresponding to a predetermined amount of an image from a host apparatus;

recording an image on a recording medium in accordance with the received image data, wherein recording areas recorded by the plural scannings of the recording means are overlapped with each other, and image recording is completed by a predetermined number of scannings of a predetermined area;

interrupting the recording in said recording step before the completion of the predetermined number of scannings of the predetermined areas; and receiving image data of another image which is contiguous to the image corresponding to the previously received image data, the recording of which has been interrupted in said interrupting step.

10. A method according to claim 9, wherein said interrupting step interrupts recording when a predetermined command is transmitted from the host apparatus.

11. A method according to claim 10, wherein commands transmittible from the host apparatus include one command concerning a first print mode, in which printing is not interrupted, and a second command concerning a second print mode, in which printing is interrupted, and wherein the predetermined command is the second command.

12. A method according to claim 10, wherein said interrupting step is cancelled by an instruction of printing mode or an instruction for starting of printing from the host apparatus.

13. A method according to claim 9, wherein said receiving step also receives and identifies an image data transmitting signal, a designation signal for a designating print mode, and an instruction signal to start printing, from the host apparatus.

14. A method according to claim 13, wherein the host apparatus has a function to detect end of printing after sending the image data transmitting signal, the designation signal and the instruction signal to start printing.

15. A method according to claim 9, wherein said recording step changes a state of ink by heating, and discharges the ink as a result of the change of state.

16. An image forming apparatus according to claim 1, further comprising:
    an image processing unit for processing image data; and
    initializing means for initializing the image processing unit.

17. An image forming apparatus according to claim 16, wherein the image processing unit is not initialized by the initializing means when recording is interrupted and image data of an image which is contiguous to the image indicated by the previously received image data is received.

18. An image recording method according to claim 9, further comprising the steps of:
    selectively initializing a parameter to be used for image processing; and
    processing image data using the parameter.

19. An image recording method according to claim 18, wherein the parameter is not initialized in said initializing step when recording is interrupted and image data of an image, which is contiguous to the image corresponding to the previously received image data, is received.

* * * * *

UNITED STATES PATENT AND TRADEMARK OFFICE
CERTIFICATE OF CORRECTION

PATENT NO. : 5,884,015

DATED : March 16, 1999

INVENTOR(S) : TOSHIYUKI YANAKA ET AL.

It is certified that error appears in the above-identified patent and that said Letters Patent is hereby corrected as shown below:

Column 6 line 15, "units 15." should read --unit 15.--.

Column 10 line 67, "one" should read --one of the--.

Column 11 line 16, "prepare" should read --be prepared--;
line 24, "image" should read --images--.

UNITED STATES PATENT AND TRADEMARK OFFICE
CERTIFICATE OF CORRECTION

PATENT NO.   :   5,884,015
DATED        :   March 16, 1999
INVENTOR(S)  :   TOSHIYUKI YANAKA ET AL.

It is certified that error appears in the above-identified patent and that said Letters Patent is hereby corrected as shown below:

<u>Column 12</u> line 48, "though" should read --through--.

<u>Column 13</u> line 17, "i" should read --in--.

Signed and Sealed this

Sixteenth Day of November, 1999

Attest:

Q. TODD DICKINSON

*Attesting Officer*    *Acting Commissioner of Patents and Trademarks*